United States Patent
Lim

(10) Patent No.: US 9,678,387 B2
(45) Date of Patent: Jun. 13, 2017

(54) LIQUID CRYSTAL DISPLAY AND METHOD OF MANUFACTURING THE SAME

(71) Applicant: Samsung Display Co., Ltd., Yongin-si (KR)

(72) Inventor: Ho Lim, Suwon-si (KR)

(73) Assignee: SAMSUNG DISPLAY CO., LTD, Gyeonggi-Do (KR)

( * ) Notice: Subject to any disclaimer, the term of this patent is extended or adjusted under 35 U.S.C. 154(b) by 0 days.

(21) Appl. No.: 14/983,303

(22) Filed: Dec. 29, 2015

(65) Prior Publication Data

US 2016/0320669 A1 Nov. 3, 2016

(30) Foreign Application Priority Data

Apr. 29, 2015 (KR) ........................ 10-2015-0060537

(51) Int. Cl.
| | |
|---|---|
| C09K 19/00 | (2006.01) |
| G02F 1/1337 | (2006.01) |
| C09K 19/56 | (2006.01) |
| C09K 19/54 | (2006.01) |

(52) U.S. Cl.
CPC ........ G02F 1/133711 (2013.01); C09K 19/54 (2013.01); C09K 19/56 (2013.01); G02F 1/133707 (2013.01); G02F 2001/133726 (2013.01); G02F 2001/133742 (2013.01); Y10T 428/10 (2015.01); Y10T 428/1005 (2015.01); Y10T 428/1023 (2015.01)

(58) Field of Classification Search
CPC ............. G02F 1/1337; G02F 1/133711; G02F 1/133723; G02F 1/133707; G02F 2001/133726; G02F 2001/133742; C09K 19/56; C08G 73/10; Y10T 428/10; Y10T 428/1005; Y10T 428/1023

USPC ......... 428/1.1, 1.2, 1.26; 349/123, 124, 127, 349/130; 528/353

See application file for complete search history.

(56) References Cited

U.S. PATENT DOCUMENTS

| | | | |
|---|---|---|---|
| 2004/0246423 A1* | 12/2004 | Sasabayashi | ..... G02F 1/133707 349/130 |
| 2009/0135462 A1 | 5/2009 | Kumar et al. | |
| 2015/0062517 A1 | 3/2015 | Lee et al. | |
| 2016/0131947 A1* | 5/2016 | Park | .................. G02F 1/133711 349/128 |

FOREIGN PATENT DOCUMENTS

| | | |
|---|---|---|
| EP | 3002324 | 4/2016 |
| KR | 1020120099652 | 9/2012 |
| KR | 1020140037832 | 3/2014 |

OTHER PUBLICATIONS

Extended European Search Report—Europen Application No. 16157349.8 dated Aug. 24, 2016, citing references listed within.

* cited by examiner

Primary Examiner — Ruiyun Zhang
(74) Attorney, Agent, or Firm — Cantor Colburn LLP

(57) ABSTRACT

A liquid crystal display including a first substrate; a second substrate facing the first substrate; an alignment layer disposed on at least one of the first substrate and the second substrate; a liquid crystal layer disposed between the first substrate and the second substrate and including a reactive mesogen; and bumps disposed adjacent to a surface of the alignment layer, wherein the alignment layer comprises a main chain and a plurality of side chains connected to the main chain, and the side chains comprise a polymerization inhibiting agent group.

20 Claims, 10 Drawing Sheets

LIQUID CRYSTAL DISPLAY AND METHOD OF MANUFACTURING THE SAME

This application claims priority to Korean Patent Application No. 10-2015-0060537, filed on Apr. 29, 2015, and all the benefits accruing therefrom under 35 U.S.C. §119, the content of which is hereby incorporated by reference.

BACKGROUND (a) Field

The present invention relates to a liquid crystal display and a manufacturing method thereof (b) Description of the Related Art Liquid crystal displays, which are one of the most common types of flat panel displays currently in use, include two sheets of display panels with field generating electrodes, such as a pixel electrode, a common electrode, and the like, and a liquid crystal layer interposed therebetween. The liquid crystal display generates an electric field in the liquid crystal layer by applying a voltage to the field generating electrodes to determine the alignment of liquid crystal molecules of the liquid crystal layer through the generated electric field and controlled polarization of incident light, thereby displaying images.

Such a liquid crystal display device includes a vertically aligned ("VA") mode liquid crystal display device, in which long axes of liquid crystal molecules are aligned to be vertical to the display panels when no electric field is applied. The VA-mode liquid crystal display has a large contrast ratio and easily implements a wide reference viewing angle, and thus has gained recognition.

The above information disclosed in this Background section is only to enhance the understanding of the background of the invention and therefore it may contain information that does not form the prior art that is already known in this country to a person of ordinary skill in the art.

SUMMARY

The disclosure has been made in an effort to provide a liquid crystal display in which an afterimage problem and reliability are improved. In order to implement a wide viewing angle and increase the response speed of the liquid crystals, a method of allowing the liquid crystals to have a pretilt angle by adding a reactive mesogen to an alignment layer or a liquid crystal layer has been developed.

In an exemplary embodiment, a liquid crystal display includes: a first substrate; a second substrate facing the first substrate; a liquid crystal layer disposed between the first substrate and the second substrate and including a reactive mesogen; an alignment layer disposed on between the first substrate and the liquid crystal layer and/or the liquid crystal layer and the second substrate; and bumps disposed adjacent to a surface of the alignment layer, wherein the alignment layer comprises a main chain and a plurality of side chains connected to the main chain, and the side chains comprise a polymerization inhibiting agent group.

In another exemplary embodiment, the bumps may include alignment polymers having pre-tilt angles.

In yet another exemplary embodiment, the polymerization inhibiting agent group suppresses polymerization by heat.

In still yet another exemplary embodiment, the polymerization inhibiting agent group may include at least one compound selected from the group consisting of:

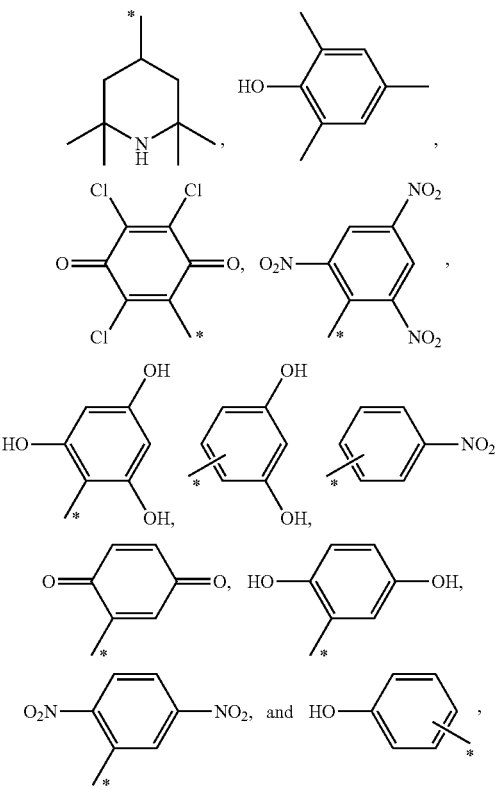

where, * denotes a portion connected with another connection group or main chain.

In an exemplary embodiment, the side chains may include

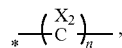

where X denotes —H, —CH$_3$, —(CH$_2$)$_m$(CH$_3$), —F, —Br, —I, —OH, —NH$_2$, or —CN, m denotes a number from 0 to 20, and n denotes a number from 0 to 20.

In another exemplary embodiment, the side chains may include

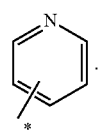

In an exemplary embodiment, the alignment layer may include a first copolymer, and the first copolymer may include a unit body represented by Structural Formula A:

Structural Formula A

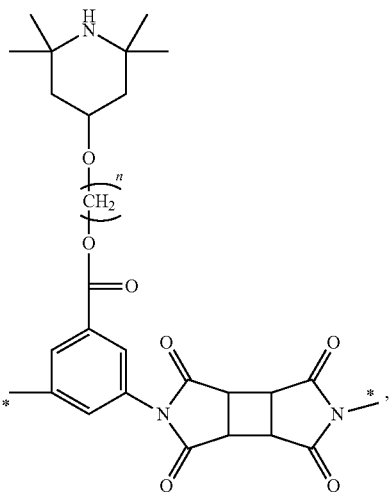

where n denotes a number from 0 to 20;

In another exemplary embodiment, the alignment layer may further include a second copolymer including at least one unit body selected from at least one of the unit bodies represented by Structural Formula B, Structural Formula C, and Structural Formula D:

Structural Formula B

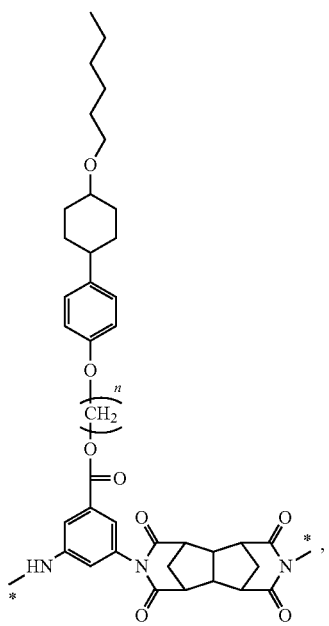

where n denotes a number from 0 to 20;

Structural Formula C where n denotes a number from 0 to 20; and

Structural Formula D

In an exemplary embodiment, the mole ratio between the first copolymer and the second copolymer may be 5:5.

In an exemplary embodiment, the reactive mesogen may include at least one compounds selected from the group of compounds represented by Chemical Formula RM-1 to Chemical Formula RM-23:

Chemical Formula RM-1

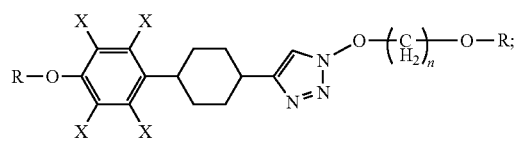

Chemical Formula RM-2

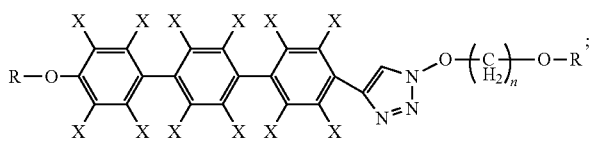

-continued
Chemical Formula RM-3
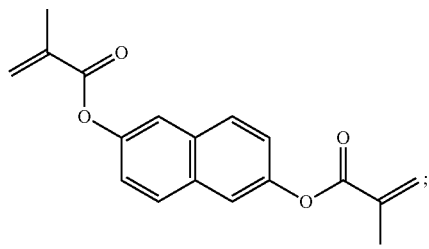
Chemical Formula RM-4
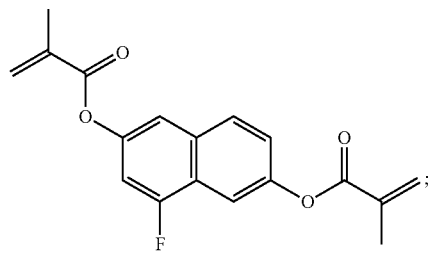
Chemical Formula RM-5
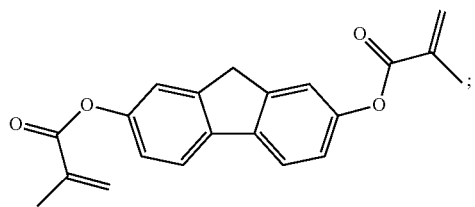
Chemical Formula RM-6
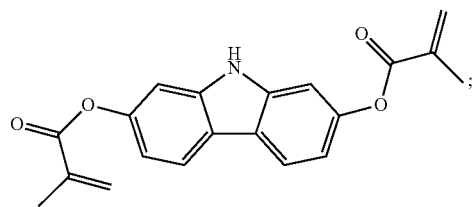
Chemical Formula RM-7
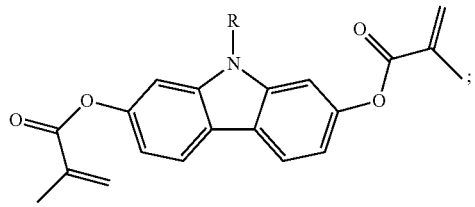
Chemical Formula RM-8
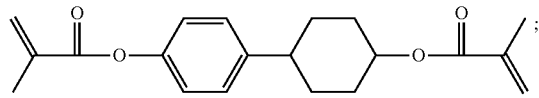
Chemical Formula RM-9
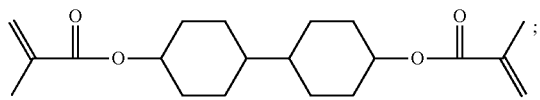
Chemical Formula RM-10
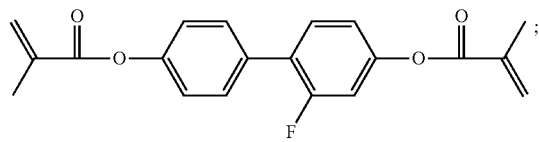
Chemical Formula RM-11
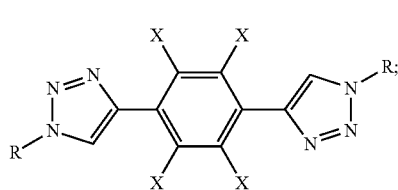
Chemical Formula RM-12
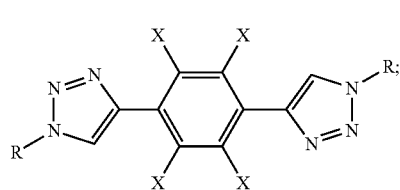
Chemical Formula 13
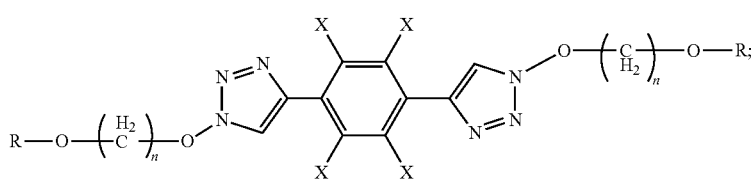
Chemical Formula RM-14
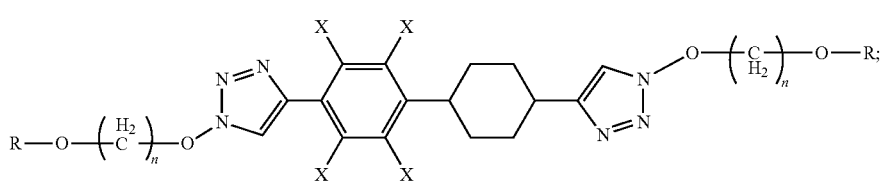

Chemical Formula RM-15
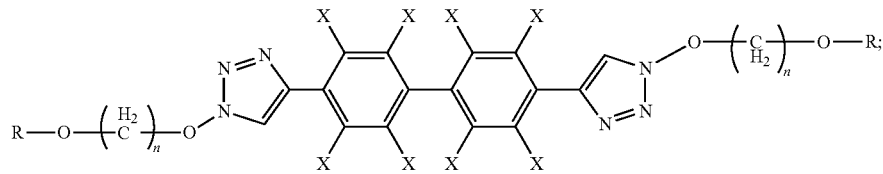

Chemical Formula RM-16
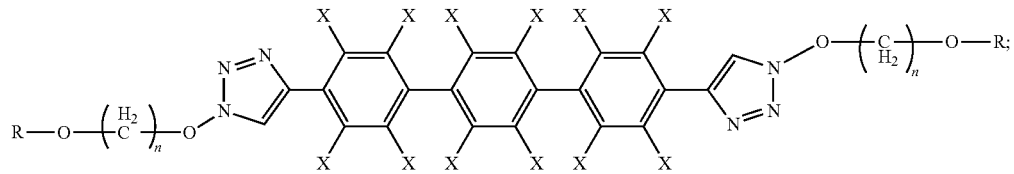

Chemical Formula RM-17
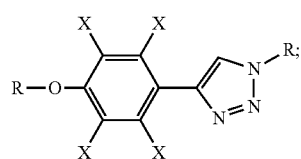

Chemical Formula RM-18
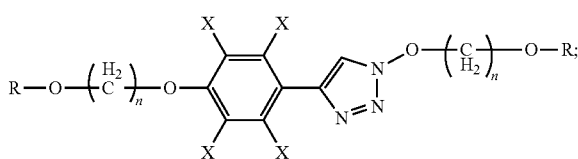

Chemical Formula RM-19
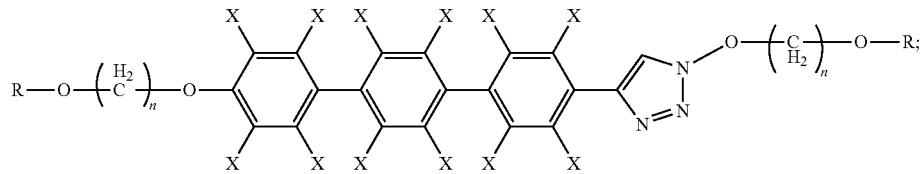

Chemical Formula RM-20
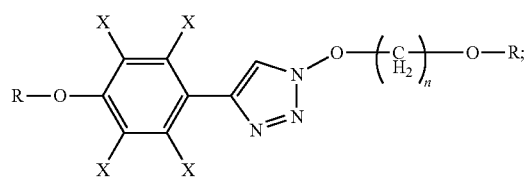

Chemical Formula RM-21
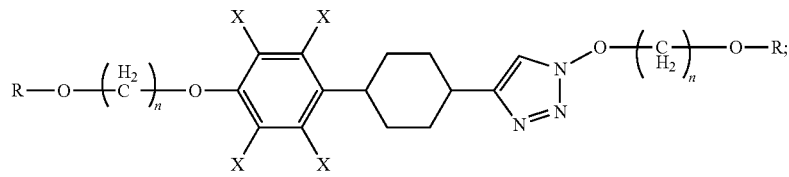

Chemical Formula RM-22
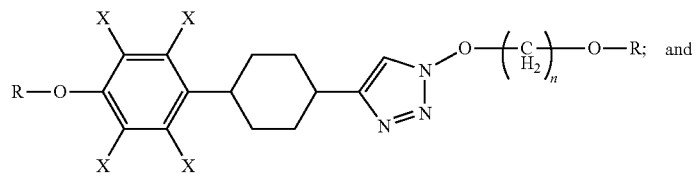

Chemical Formula RM-23
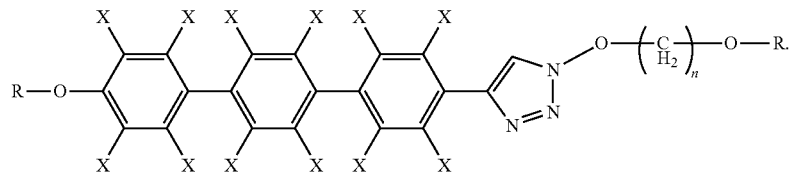

In an exemplary embodiment, in each of Chemical Formula RM-1, Chemical Formula RM-2, Chemical Formula RM-7, Chemical Formula RM-11, and Chemical Formula RM-12 to Chemical Formula RM-23, X is one of —H, —CH$_3$, —(CH$_2$)$_m$(CH$_3$), —F, —Br, —I, —OH, —NH$_2$, and —CN, R is one of

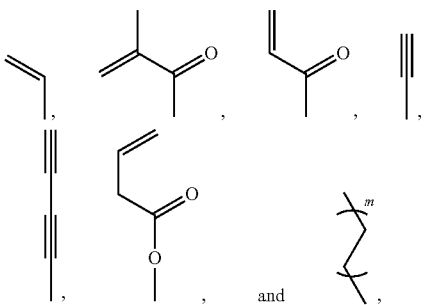

m in —$(CH_2)_m(CH_3)$ and

is 0 to 20, and n in the above chemical formulas is 0 to 20.

In an exemplary embodiment, the polymerization inhibiting agent group may be located at the end of the side chain located away from the main chain.

In another exemplary embodiment, liquid crystal molecules included in the liquid crystal layer may be vertically arranged when an electric field is not applied.

In still another exemplary embodiment, a method for manufacturing a liquid crystal display is provided. The method includes: forming a field generating electrode on at least one of a first substrate and a second substrate that faces the first substrate; coating an alignment material and an alignment assistant agent on the field generating electrode; forming a liquid crystal layer including liquid crystal molecules between the first substrate and the second substrate; forming an alignment layer including a main chain and a side chain connected to the main chain by baking the alignment material; discharging the alignment assistant agent to the liquid crystal layer; and light-irradiating while an electric field is applied thereto, wherein the side chain includes a polymerization inhibiting agent group, and the alignment assistant agent discharged to the liquid crystal layer is polymerized when the light is irradiated such that bumps are formed adjacent to a surface of the alignment layer.

In an exemplary embodiment, the bumps may include alignment polymers formed by polymerization of the alignment assistant agent and have pre-tilts.

In another exemplary embodiment, the polymerization inhibiting agent group may suppress polymerization of the alignment assistant agent in baking of the alignment material.

In yet another exemplary embodiment, the polymerization inhibiting agent group comprises at least one compound selected from the group of compounds represented below

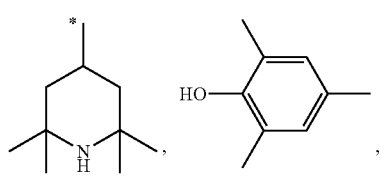

-continued

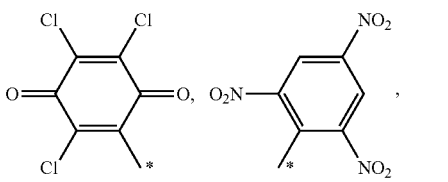

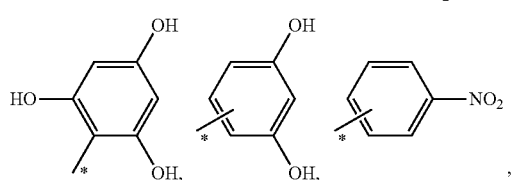

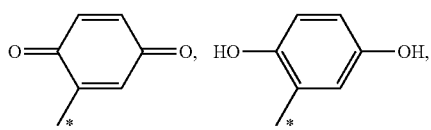

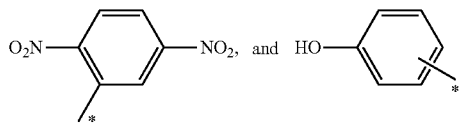

where, * denotes a portion connected with another connection group or main chain.

In an exemplary embodiment, the alignment layer may include a first copolymer, and the first copolymer may include a unit body represented by Structural Formula A.

Structural Formula A

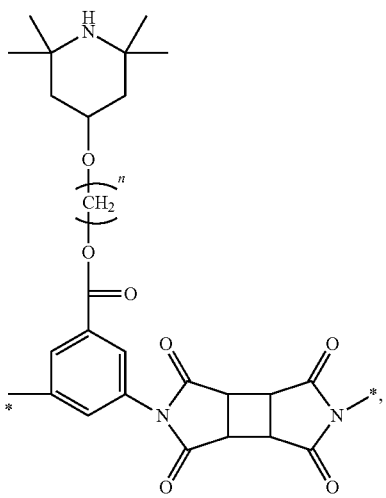

where n denotes a number from 0 to 20.

In an exemplary embodiment, the reactive mesogen comprises at least one compound selected from the group of compounds represented by Chemical Formula RM-1 to Chemical Formula RM-23:

Chemical Formula RM-1
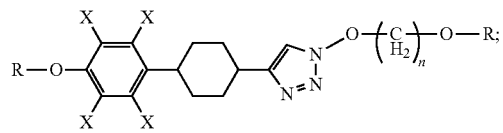
Chemical Formula RM-2
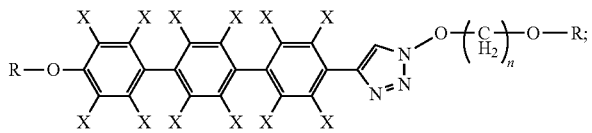
Chemical Formula RM-3
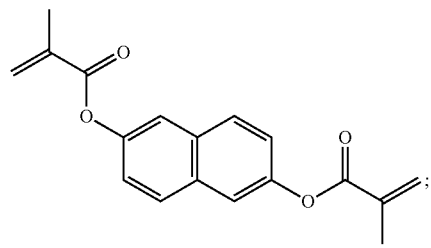
Chemical Formula RM-4
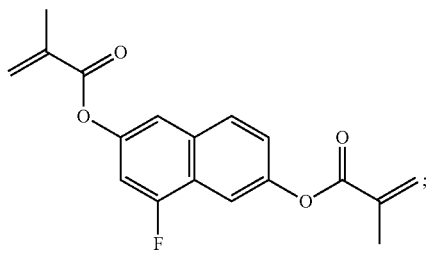
Chemical Formula RM-5
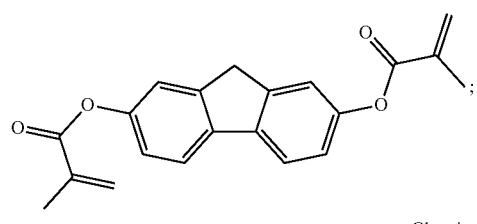
Chemical Formula RM-6
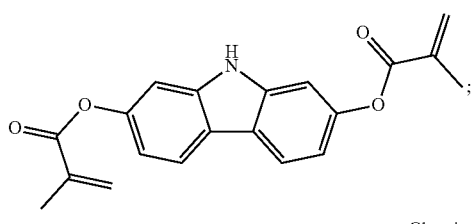
Chemical Formula RM-7
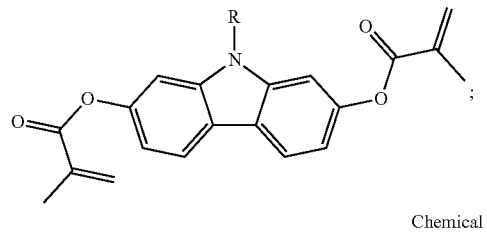
Chemical Formula RM-8
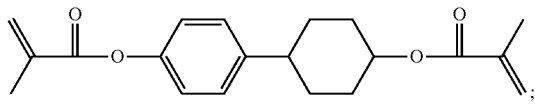
Chemical Formula RM-9
Chemical Formula RM-10
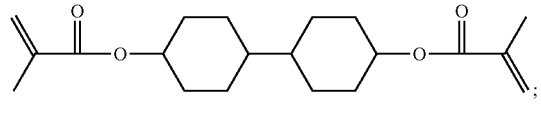
Chemical Formula RM-11
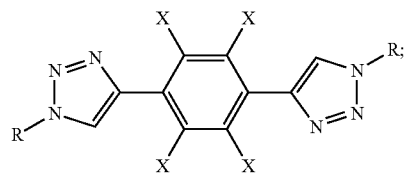
Chemical Formula RM-12
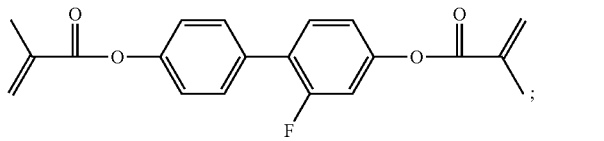
Chemical Formula RM-13
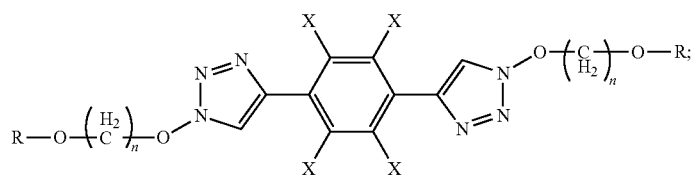
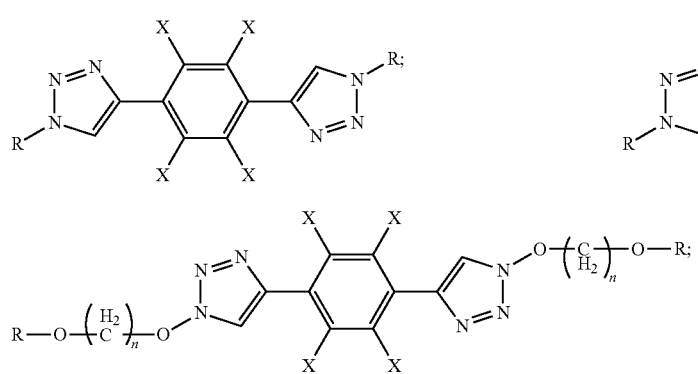
Chemical Formula RM-14
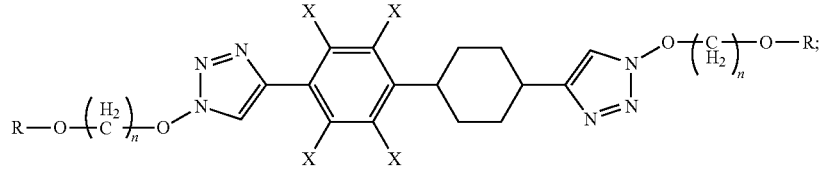

-continued

Chemical Formula RM-15

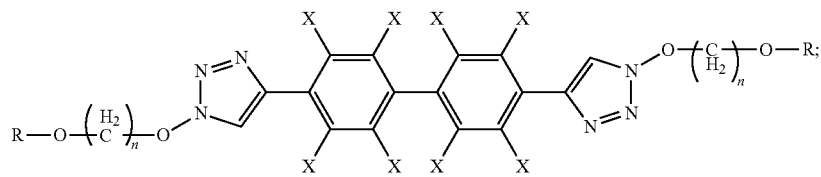

Chemical Formula RM-16

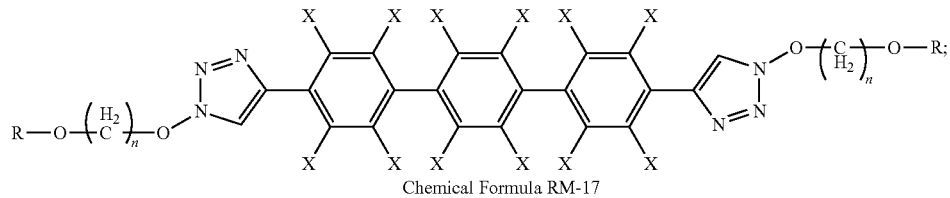

Chemical Formula RM-17

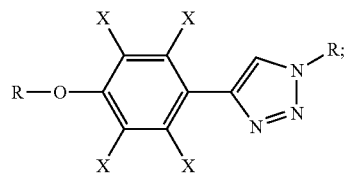

Chemical Formula RM-18

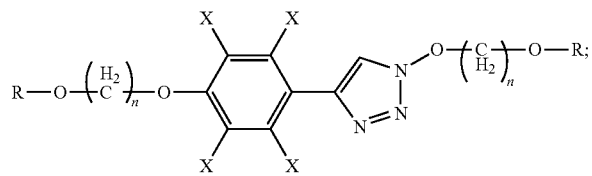

Chemical Formula RM-19

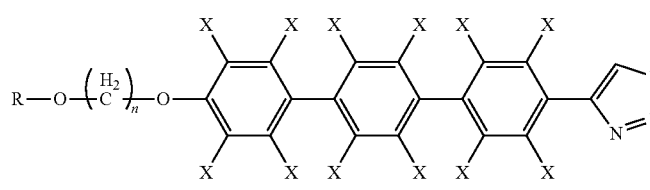

Chemical Formula RM-20

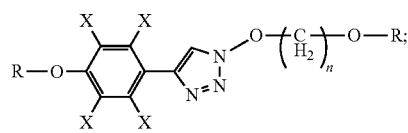

Chemical Formula RM-21

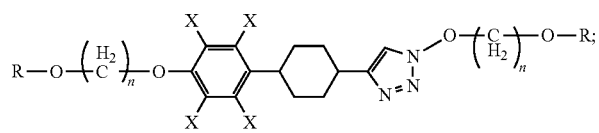

Chemical Formula RM-22

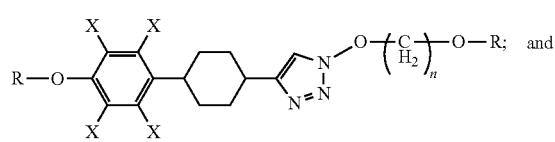

Chemical Formula RM-23

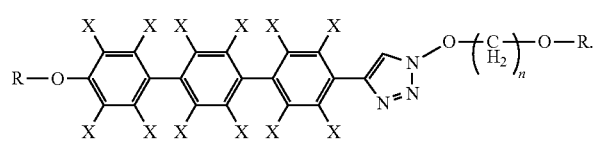

In an exemplary embodiment, in each of Chemical Formula RM-1, Chemical Formula RM-2, Chemical Formula RM-7, Chemical Formula RM-11, and Chemical Formula RM-12 to Chemical Formula RM-23, X is one of —H, —$CH_3$, —$(CH_2)_m(CH_3)$, —F, —Br, —I, —OH, —$NH_2$, and —CN, R is one of

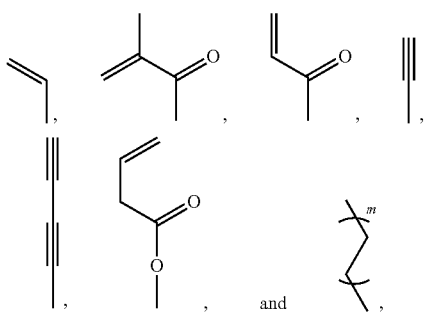

m in —$(CH_2)_m(CH_3)$ and

is 0 to 20, and n in the above chemical formulas is 0 to 20.

In an exemplary embodiment, the polymerization inhibiting agent group may be located at the end of the side chain located away from the main chain.

In another exemplary embodiment, liquid crystal molecules included in the liquid crystal layer may be vertically arranged when an electric field is not applied.

In yet another exemplary embodiment, the polymerization inhibiting agent is formed in the side chain of the alignment layer and high-reactive mesogen is added to the alignment layer so as to minimize exhaustion of the reactive mesogen from thermal reaction or light reaction and realize a pre-tilt angle. Thus, the degree of polymerization of the reactive mesogen is increased and accordingly mechanical properties are increased, thereby improving afterimage problems and reliability.

BRIEF DESCRIPTION OF THE DRAWINGS

The above and other aspects, advantages and features of this disclosure will become more apparent by describing in further detail exemplary embodiments thereof with reference to the accompanying drawings, in which.

DETAILED DESCRIPTION

Figure 1:
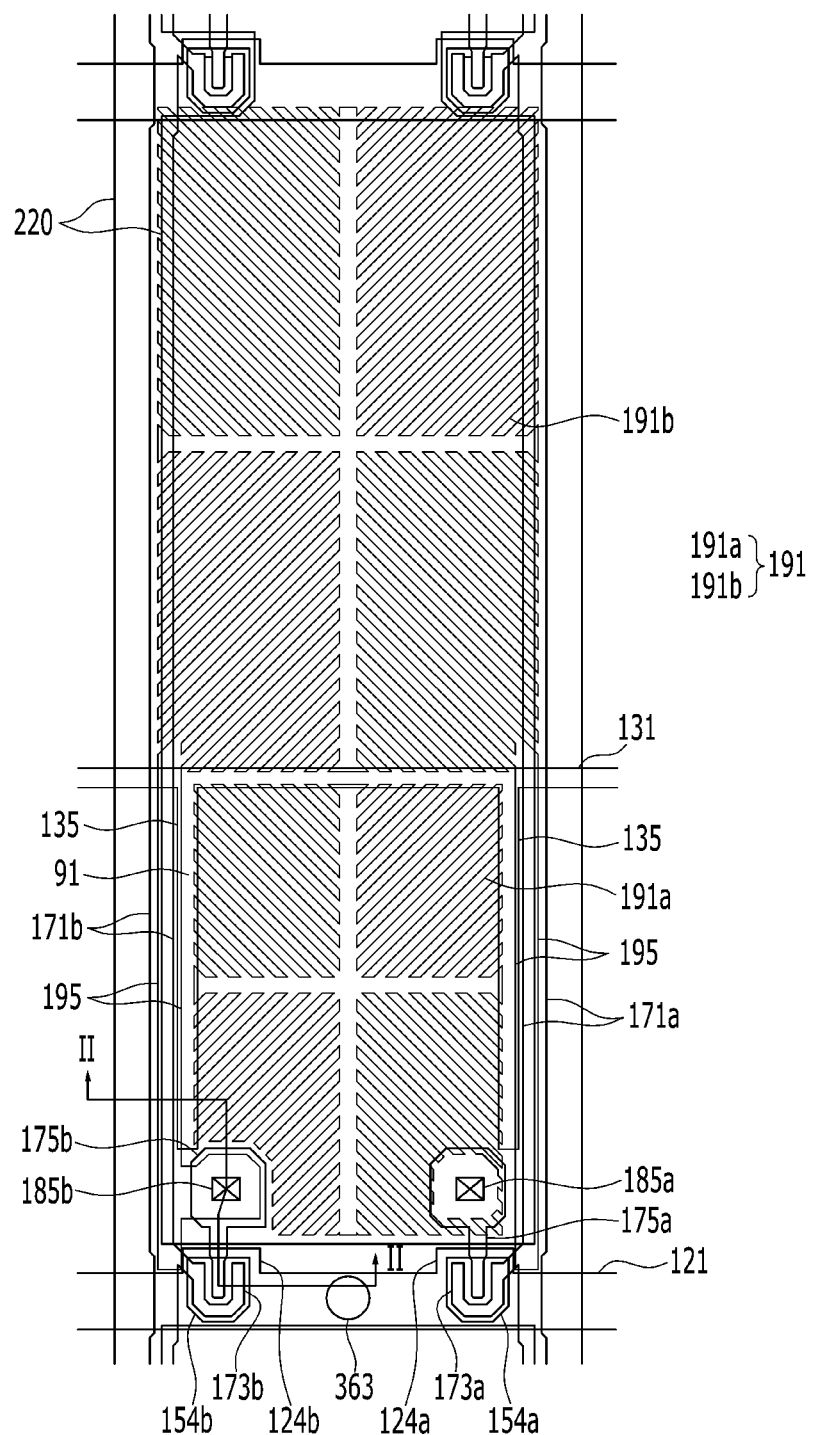
FIG. 1 illustrates a top plan view of an exemplary embodiment of a liquid crystal display.

Hereinafter, exemplary embodiments of the present invention will be described in detail with reference to the accompanying drawings. As those skilled in the art would realize, the described embodiments may be modified in various different ways, all without departing from the spirit or scope of the present invention. On the contrary, exemplary embodiments introduced herein are provided to make the disclosed contents thorough and complete, and to sufficiently transfer the spirit of the present invention to those skilled in the art.

In the drawings, the thickness of layers, films, panels, regions, etc., are exaggerated for clarity. It will be understood that when a layer is referred to as being "on" another layer or substrate, it can be directly on the other layer or substrate, or intervening elements may also be present. Like reference numerals designate like elements throughout the specification.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another elements as illustrated in the Figures. It will be understood that relative terms are intended to encompass different orientations of the device in addition to the orientation depicted in the Figures. For example, if the device in one of the Figures is turned over, elements described as being on the "lower" side of other elements would then be oriented on "upper" sides of the other elements. The exemplary term "lower," can therefore, encompasses both an orientation of "lower" and "upper," depending on the particular orientation of the Figure. Similarly, if the device in one of the Figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the Figures are schematic in nature and their shapes are not intended to illustrate the precise shape of a region and are not intended to limit the scope of the present claims.

Figure 2:
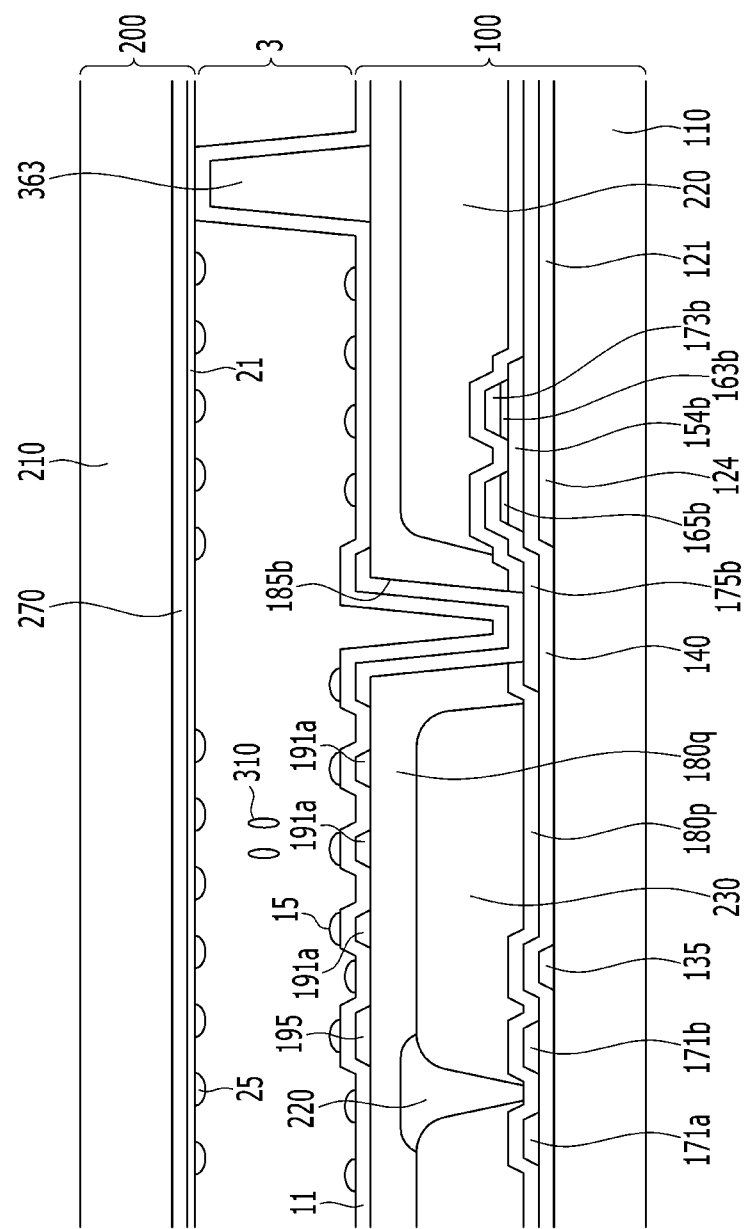
FIG. 2 illustrates a cross-sectional view of FIG. 1, taken along the line II-II.

FIG. 1 illustrates an exemplary embodiment of a top plan view of a liquid crystal display. FIG. 2 illustrates a cross-sectional view of FIG. 1, taken along the line II-II.

Referring to FIG. 1 and FIG. 2, in an exemplary embodiment, a liquid crystal display includes a lower panel 100, an upper panel 200, and a liquid crystal layer 3. The lower panel 100 and the upper panel 200 face each other, and the liquid crystal layer 3 is disposed between the two panels 100 and 200.

First, the lower panel 100 will be described.

A plurality of gate lines 121 and a plurality of storage electrode lines 131 and 135 are disposed on a first substrate that corresponds to an insulation substrate.

The gate lines 121 transmit a gate signal and substantially extend in a horizontal direction. The gate lines 121 may include a wide end portion (not shown) for connection to a gate electrode 124 and another layer or an external driving circuit (not shown). The gate lines 121 may be made of an aluminum-based metal such as aluminum (Al) or an aluminum alloy, a silver-based metal such as silver (Ag) or a silver alloy, a copper-based metal such as copper (Cu) or a copper alloy, a molybdenum-based metal such as molybdenum (Mo) or a molybdenum alloy, chromium (Cr), tantalum (Ta), and titanium (Ti), or the like. In an exemplary embodiment, the gate lines 121 may have a multilayered structure including at least two conductive layers having different physical properties (not shown). Each gate line 121 may include a plurality of first and second gate electrodes 124a and 124b, which protrude from the gate line 121.

The storage electrode lines 131 and 135 include a stem line 131 that is substantially parallel to the gate line 121 and a plurality of storage electrodes 135 that extend from the stem line 131.

The shape and alignment of the storage electrode lines 131 and 135 may be variously modified.

A gate insulating layer 140 is disposed on the gate line 121 and the storage electrode lines 131 and 135. A plurality of semiconductor layers 154a and 154b made of amorphous or crystalline silicon are disposed on the gate insulating layer 140.

In an exemplary embodiment, a plurality of pairs of ohmic contacts may be disposed on each of the semiconductor layers 154a and 154b. In FIG. 2, ohmic contacts 163b and 165b disposed on the second semiconductor layer 154b are illustrated as an example of the plurality of pairs of ohmic contacts. In another embodiment, the ohmic contacts may be disposed on the first semiconductor layer 154a. The ohmic contacts 163b and 165b may be made of a silicide or a material such as n+ hydrogenated amorphous silicon in which an n-type impurity is doped at a high concentration.

A plurality of pairs of data lines 171a and 171b and a plurality of pairs of first and second drain electrodes 175a and 175b are disposed on the ohmic contacts 163b and 165b and the gate insulating layer 140.

The data lines 171a and 171b transmit a data signal and substantially extend in a vertical direction to cross the gate lines 121 and the stem line 131 of the storage electrode line. The data lines 171a and 171b include first and second source electrodes 173a and 173b which extend toward the first and second gate electrodes 124a and 124b to be curved in a U shape, and the first and second source electrodes 173a and 173b face the first and second drain electrodes 175a and 175b based on the first and second gate electrodes 124a and 124b.

The first and second drain electrodes 175a and 175b extend upwards from ends which are partially surrounded by the first and second source electrodes 173a and 173b, respectively, and the opposite ends may have a wide area for connection with other layers.

However, the shapes and layouts of the data lines 171a and 171b, as well as the first and second source electrodes 173a and 173b and the first and second drain electrodes 175a and 175b, may be variously modified.

The first gate electrode 124a, the first source electrode 173a, and the first drain electrode 175a form a first thin film transistor ("TFT") together with the first semiconductor layer 154a; the second gate electrode 124b, the second source electrode 173b, and the second drain electrode 175b form a second thin film transistor together with the second semiconductor layer 154b; a channel of the first thin film transistor is formed in the first semiconductor layer 154a between the first source electrode 173a and the first drain electrode 175a, and a channel of the second thin film transistor is formed in the second semiconductor layer 154b between the second source electrode 173b and the second drain electrode 175b.

The ohmic contacts 163b and 165b are disposed only among the semiconductors 154a and 154b therebelow, the data lines 171a and 171b thereabove, and the drain electrodes 175a and 175b in order to reduce contact resistance therebetween. Exposed portions, which are not covered by the data lines 171a and 171b and the drain electrodes 175a and 175b between the source electrodes 173a and 173b, exist in the semiconductors 154a and 154b along with the drain electrodes 175a and 175b.

A lower passivation layer 180p made of silicon nitride or silicon oxide is disposed on the data lines 171a and 171b, the source electrodes 173a and 173b, the drain electrodes 175a and 175b, and the exposed portions of the semiconductor layer 154a and 154b.

A color filter 230 is disposed on the lower passivation layer 180p. The color filter 230 may display primary colors, such as red, green, and blue, and the primary colors may include red, green, and blue, or yellow, cyan, and magenta. Although not illustrated, in an exemplary embodiment, the color filter may further include a color filter displaying a mix of the primary colors or white in addition to the primary colors. A light blocking member 220 formed of a single layer or a double layer of chromium and a chromium oxide or of an organic material may be disposed on the color filter 230. The light blocking member 220 may include openings arranged in a matrix format.

An upper passivation layer 180q made of a transparent organic insulating material is disposed on the color filter 230 and the light blocking member 220. The upper passivation layer 180q prevents the color filter 230\from being exposed and provides a flat surface. A plurality of contact holes 185a and 185b, exposing the first and second drain electrodes 175a and 175b, are formed in the lower passivation layer 180p and the upper passivation layer 180q.

A plurality of pixel electrodes 191 are disposed on the upper passivation layer 180q. The pixel electrode 191 may be made of a reflective metal such as aluminum, silver, chromium, or the like or an alloy thereof.

Figure 4:
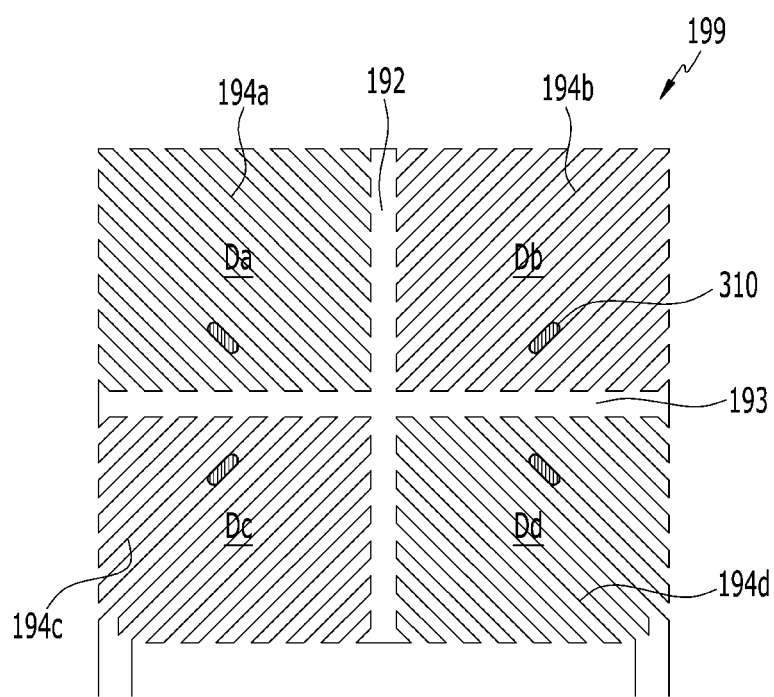
FIG. 4 illustrates a top plan view of an exemplary embodiment of a basic electrode of the liquid crystal display.

Each pixel electrode 191 includes a first sub-pixel 191a and a second sub-pixel 191b that are separated from each other, and each of the first and second sub-pixel electrodes 191a and 191b includes at least one of a basic electrode shown in FIG. 4 or a variation of the basic electrode 199.

A structure of the pixel electrode 191 will be described with reference to FIG. 3 and FIG. 4.

Next, the upper panel 200 will be described.

A common electrode 270 is formed on the entire surface of a second substrate 210, which is a transparent insulating substrate and serves as a second substrate.

A column spacer 363 is formed on the liquid crystal layer 3 to maintain a gap between the upper panel 200 and the lower panel 100.

Alignment layers 11 and 21 are disposed in inner surfaces of the lower panel 100 and the upper panel 200. The alignment layers 11 and 21 may be vertical alignment layers. The alignment layers 11 and 21 include main chains and side chains connected to the main chains, and the main chains include polyimide and the side chains include a vertical alignment group and a polymerization inhibiting agent. In an exemplary embodiment, the side chains may further include a group for additional improvement of a voltage holding ratio.

The polymerization inhibiting agent included in the side chain serves to suppress polymerization of an alignment agent that corresponds to a reactive mesogen in a bake process of an alignment material. That is, in an exemplary embodiment. the polymerization inhibiting group has a property that suppresses polymerization due to heat.

In an exemplary embodiment, the polymerization inhibiting group may include at least one compound selected from the following group of compounds:

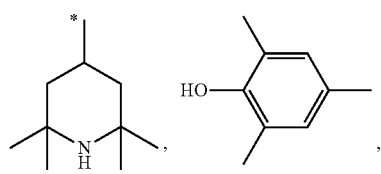

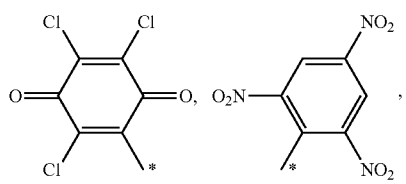

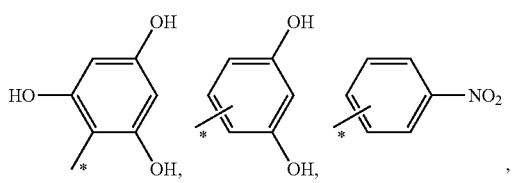

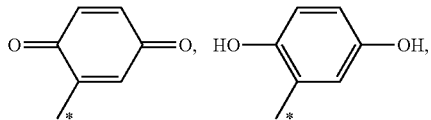

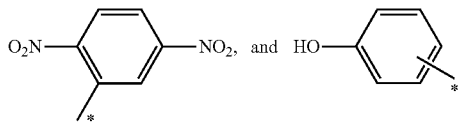

where, * is a portion connected with another connection group or main chain. However, this is not restrictive, and various materials that include a chemical group that can trap free radicals to suppress polymerization are applicable. In an exemplary embodiment, the polymerization inhibiting group is preferably disposed at an end of the side chain that is away from the main chain.

In another exemplary embodiment, structures of the alignment layers 11 and 21 may include a copolymer including a unit body represented by Chemical Formula 1:

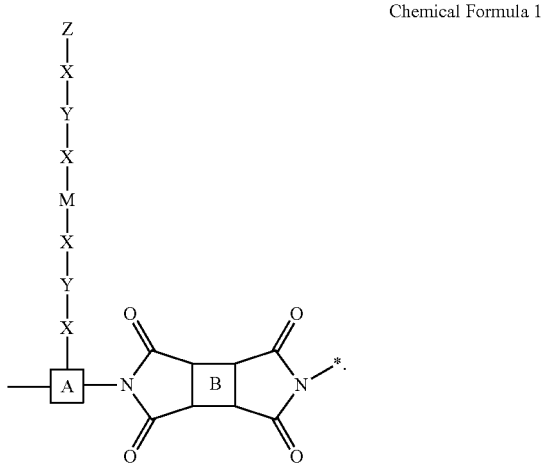

Chemical Formula 1

In Chemical Formula 1, at least one compound for A may be selected from the following group of compounds

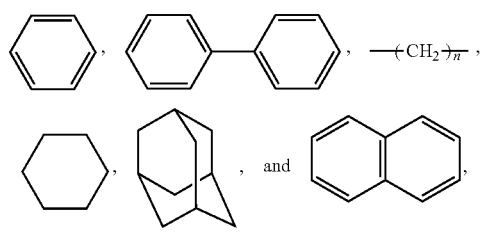

and at least one compound for B may be selected from the following group of compounds

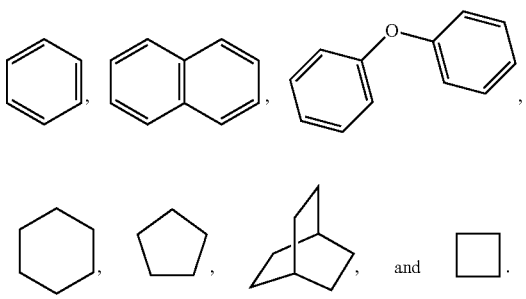

In Chemical Formula 1, at least one compound X may be selected from the following group of compounds

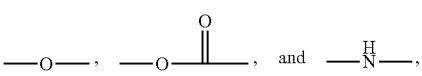

at least one compound Y may be selected from the following group of compounds

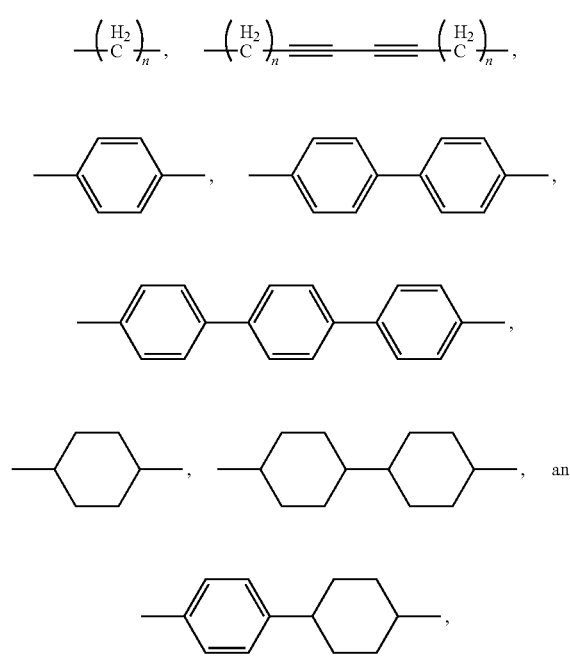

and at least one compound M may be selected from the following group of compounds

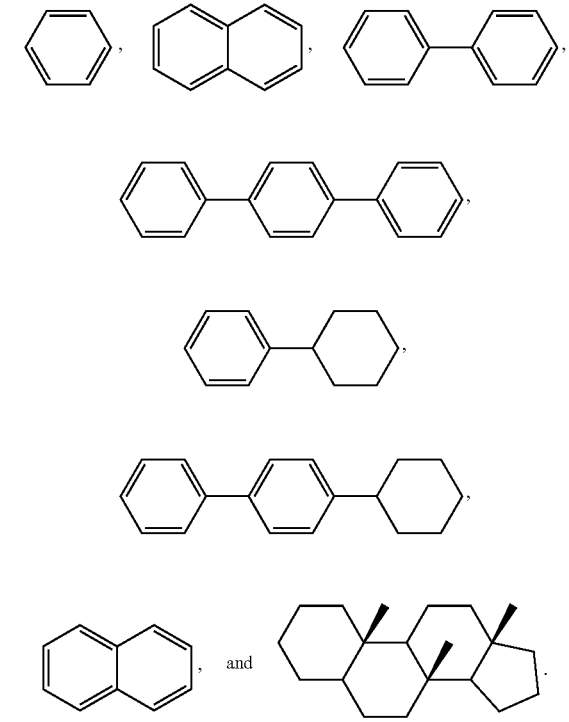

In Chemical Formula 1, at least one compound Z may be selected from the following group of compounds

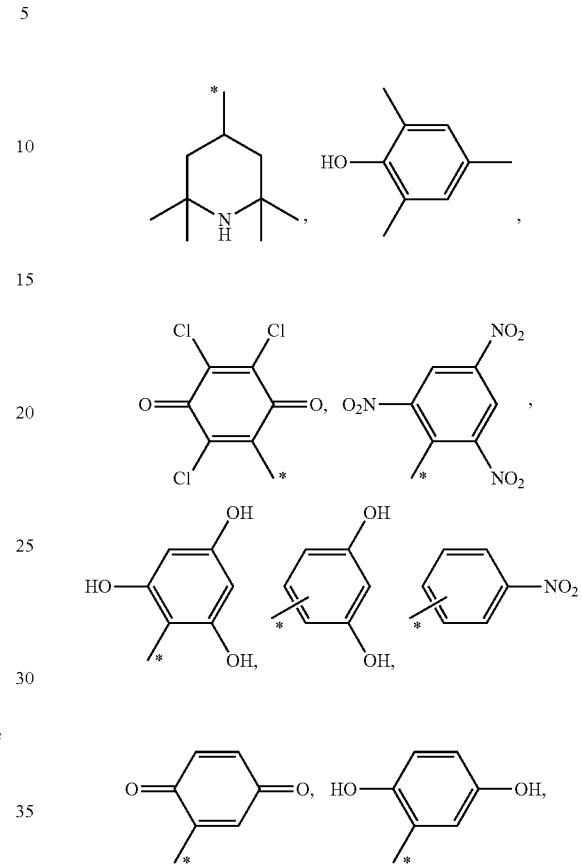

where X denotes —H, —CH$_3$, —(CH$_2$)$_m$(CH$_3$), —F, —Br, —I, —OH, —NH$_2$, or —CN, m denotes a number from 0 to 20, and n denotes a number from 0 to 20, and

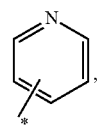

and further, where, * is a portion connected with another connection group or main chain.

In an exemplary embodiment, a copolymer included in the alignment layers 11 and 21 may include a first copolymer including a unit body represented by Structural Formula A:

Structural Formula A

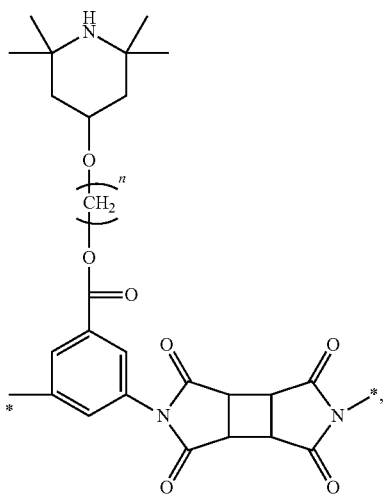

where n denotes 0 to 20.

In an exemplary embodiment, the copolymer included in the alignment layers 11 and 21 may further include a second copolymer including at least one of the unit bodies represented by the following Structural Formula B, Structural Formula C, and Structural Formula D:

Structural Formula B

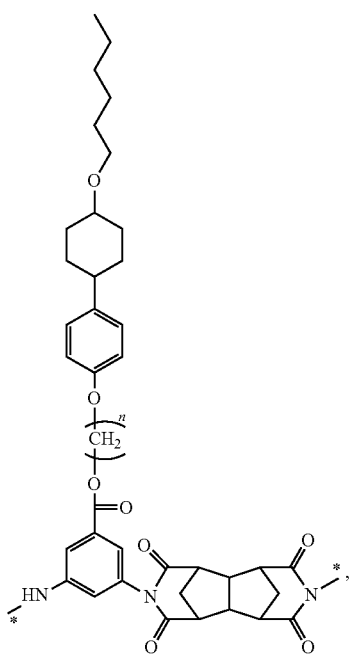

where n denotes a number from 0 to 20;

Structural Formula C

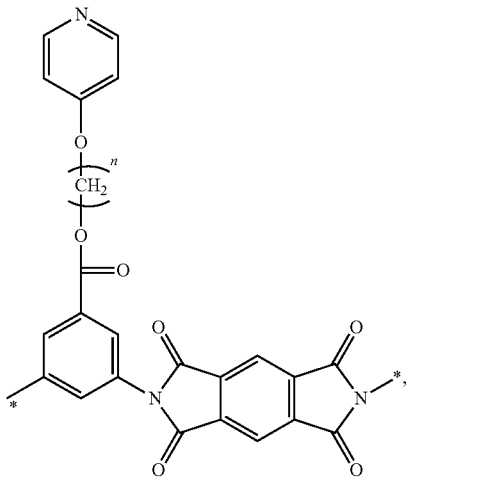

where n denotes 0 to 20; and

Structural Formula D

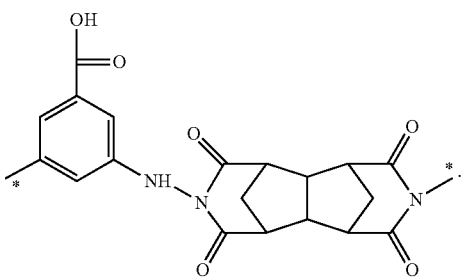

A mole ratio between the first copolymer and the second copolymer included in the alignment layers 11 and 21 may be about 5:5.

In an exemplary embodiment of the first copolymer, a compound represented by Chemical Formula 2 may be included:

Chemical Formula 2

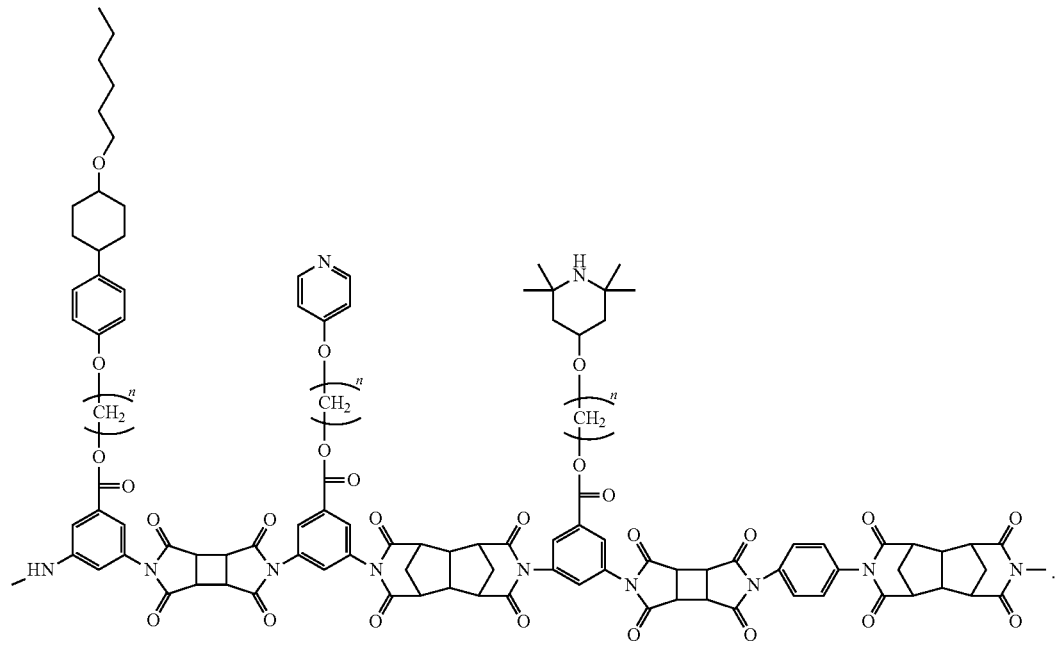

In an exemplary embodiment, the second polymer may be a compound represented by Chemical Formula 3:

Chemical Formula 3

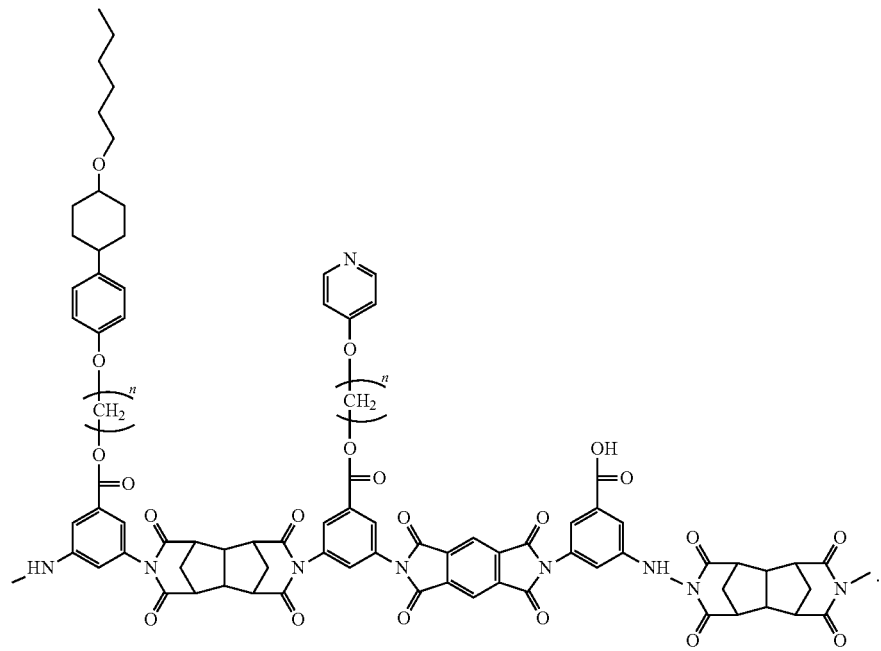

In a liquid crystal display that includes the copolymers represented by Chemical Formula 2 and Chemical Formula 3, a mole ratio between the copolymer of Chemical Formula 2 and the copolymer of the Chemical Formula 3 may be about 5:5.

In an exemplary embodiment, the lower alignment layer 11 may substantially cover the column spacer 363 with a uniform thickness.

In an exemplary embodiment, bumps 15 and 25 are formed on the surfaces of the alignment layers 11 and 21.

The bumps 15 and 25 may be formed by light-irradiating a reactive mesogen, which is an alignment agent included in the liquid crystal layer 3. The reactive mesogen included in the liquid crystal layer 3 may be a material discharged to the liquid crystal layer 3 during a bake process after being mixed with the alignment material that forms the alignment layers 11 and 21 and then coated. In an aspect of the exemplary embodiment, the bumps 15 and 25 include alignment polymers having pre-tilt angles. The alignment polymer may be formed by using light to irradiate the reactive mesogen.

The reactive mesogen according to an exemplary embodiment may include at least one compound selected from the group of compounds represented by Chemical Formula RM-1 to Chemical Formula RM-23:

Chemical Formula RM-1

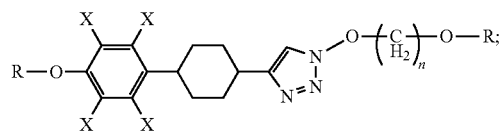

Chemical Formula RM-2

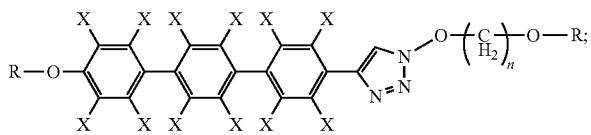

Chemical Formula RM-3

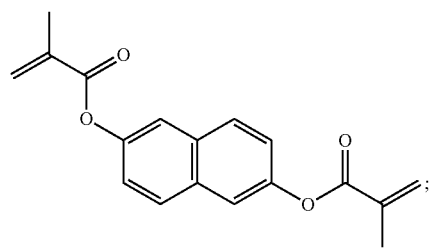

Chemical Formula RM-4

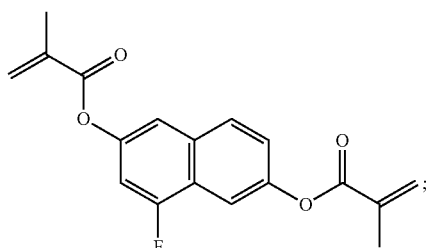

Chemical Formula RM-5

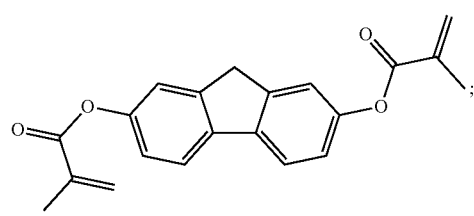

Chemical Formula RM-6

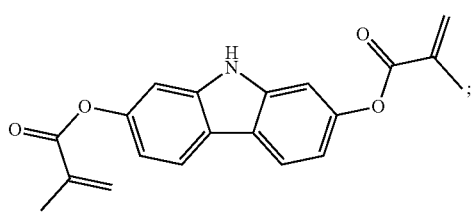

Chemical Formula RM-7

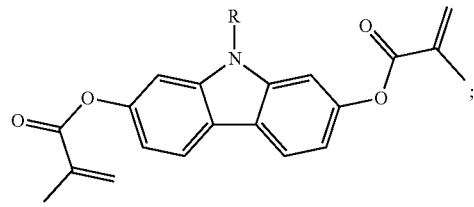

Chemical Formula RM-8

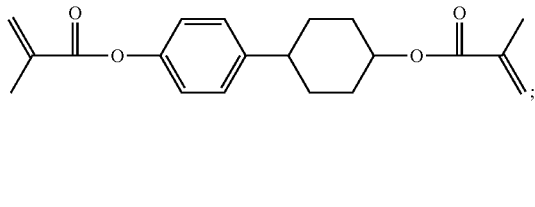

Chemical Formula RM-9

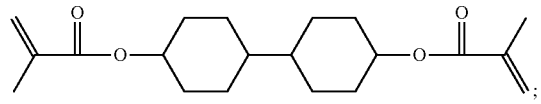

Chemical Formula RM-10

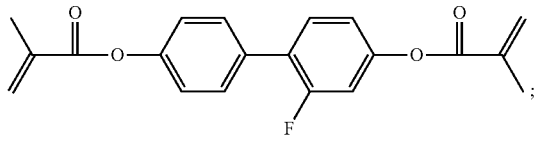

Chemical Formula RM-11

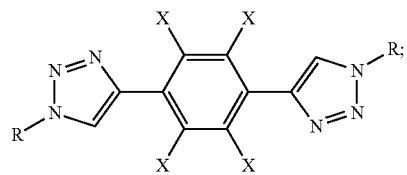

Chemical Formula RM-12

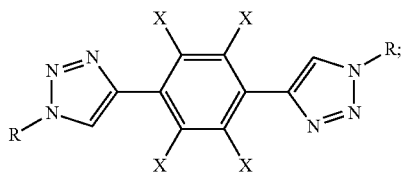

Chemical Formula RM-13

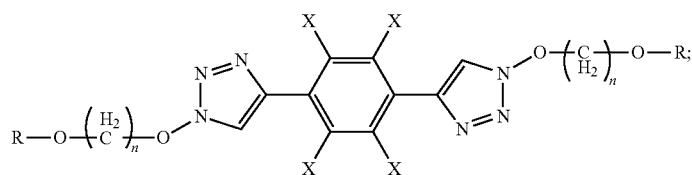

-continued

Chemical Formula RM-14
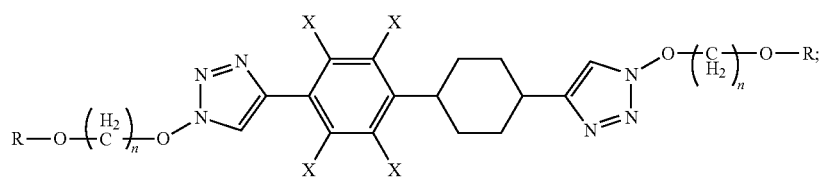

Chemical Formula RM-15
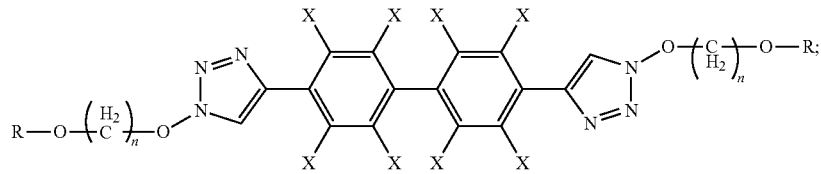

Chemical Formula RM-16
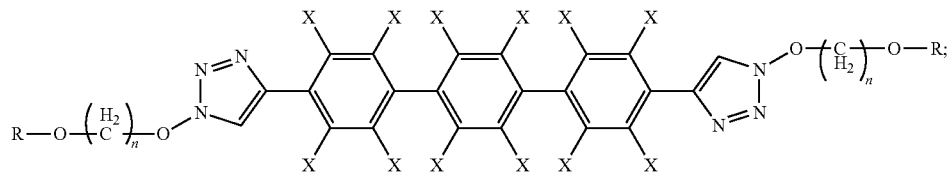

Chemical Formula RM-17

Chemical Formula RM-18

Chemical Formula RM-19
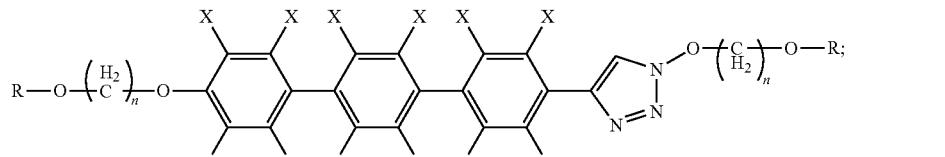

Chemical Formula RM-20

Chemical Formula RM-21

Chemical Formula RM-22

Chemical Formula RM-23

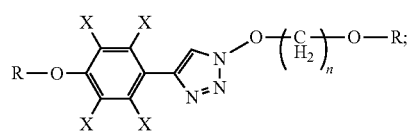
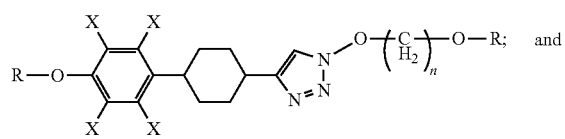
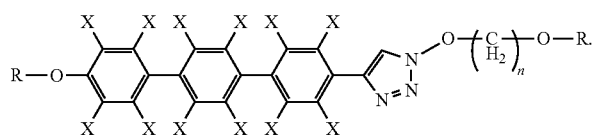

In each of Chemical Formula RM-1, Chemical Formula RM-2, Chemical Formula RM-7, Chemical Formula RM-11, and Chemical Formula RM-12 to Chemical Formula RM-23, X is one of —H, —$CH_3$, —$(CH_2)_m(CH_3)$, —F, —Br, —I, —OH, —$NH_2$, and —CN, R is one of

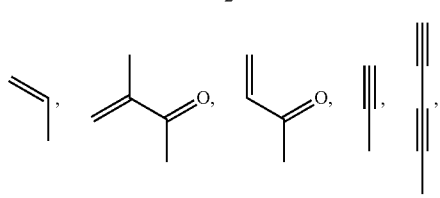

-continued

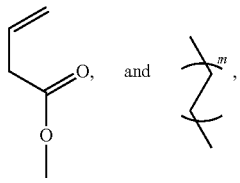

where in —$(CH_2)_m(CH_3)$ and

m is 0 to 20, and n in the above-stated chemical formulas is 0 to 20.

The reactive mesogen in the present exemplary embodiment may be mixed in an amount of about 7 weight percent (wt %) to 25 wt % of the alignment material forming the alignment layers 11 and 21, based on the total weight of the alignment material.

Additionally, a polarizer (not shown) may be disposed on an outer surface of the lower panel 100 and the upper panel 200.

Referring back to FIG. 1 and FIG. 2, the liquid crystal layer 30 including liquid crystals 310 is disposed between the lower panel 100 and the upper panel 200.

The liquid crystals 310 have a negative dielectric anisotropy, and they are aligned so that the long axes thereof are perpendicular to the surfaces of the two panels 100 and 200 without applying an electric field.

The alignment polymer included in the bumps 15 and 25 and formed from light irradiated onto the reactive mesogen serves to control the pre-tilt angle, which is an initial alignment direction of the liquid crystals 310.

Figure 3:
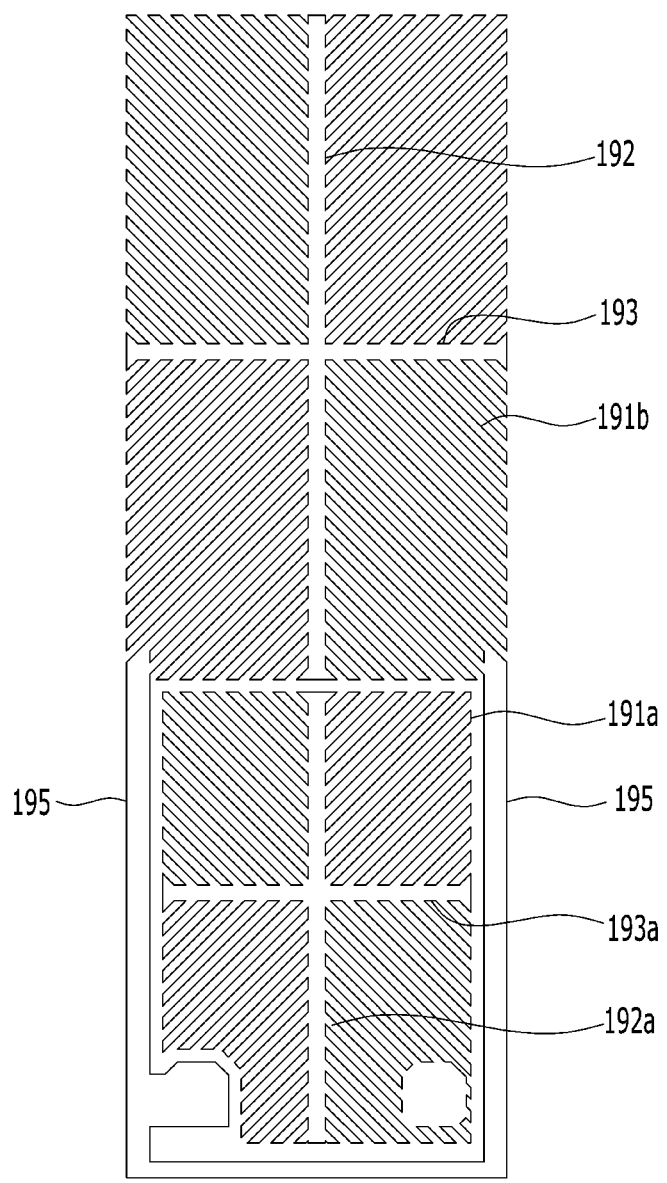
FIG. 3 illustrates a top plan view of an exemplary embodiment of a pixel electrode.

FIG. 3 illustrates a top plan view of an exemplary embodiment of a pixel electrode. FIG. 4 illustrates a top plan view of an exemplary embodiment of a basic electrode of the liquid crystal display.

Referring to FIG. 3 and FIG. 4, a basic electrode 199 will now be described in detail.

As shown in FIG. 4, the entire shape of the basic electrode 199 is a quadrangle and includes a cross stem configured from a horizontal stem 193 and a vertical stem 192 perpendicular to the horizontal stem 193. Further, the basic electrode 199 is divided into a first sub-region Da, a second sub-region Db, a third sub-region Dc, and a fourth sub-region Dd, which are divided based on the horizontal stem 193 and the vertical stem 192, and the respective sub-regions Da-Dd include a plurality of first minute branches 194a, a plurality of second minute branches 194b, a plurality of third minute branches 194c, and a plurality of fourth minute branches 194d.

The first minute branches 194a extend obliquely in an upper left direction from the horizontal stem 193 or the vertical stem 192, and the second minute branches 194b extend obliquely in an upper right direction from the horizontal stem 193 or the vertical stem 192. Further, the third minute branches 194c extend obliquely in a lower left direction from the horizontal stem 193 or the vertical stem 192, and the fourth minute branches 194d extend obliquely in a lower right direction from the horizontal stem 193 or the vertical stem 192.

The first to fourth minute branches 194a, 194b, 194c, and 194d form an angle of about 45 to about 135 degrees with the gate line 121 or the horizontal stem 193. In addition, minute branches 194a, 194b, 194c, and 194d of two neighboring sub-regions of Da, Db, Dc, and Dd may perpendicularly cross each other.

The width of the minute branches 194a to 194d may be about 2.0 micrometers (μm) to about 5.0 μm, and a gap between neighboring minute branches 194a to 194d in one sub-region Da to Dd may be about 2.5 μm to about 5.0 μm.

Although not illustrated, the width of the minute branches 194a, 194b, 194c, and 194d may gradually widen closer to the horizontal stem 193 or the vertical stem 192.

Referring to FIG. 1 to FIG. 3, first and second sub-pixel electrodes 191a and 191b respectively include one basic electrode 199. However, in the entire pixel electrode 191, an area occupied by the second sub-pixel electrode 191b may be greater than an area occupied by the first sub-pixel electrode 191a, in which case the size of the basic electrode 199 of the second sub-pixel electrode 191b may be controlled to make the area of the second sub-pixel electrode 191b about 0.1 times to about 2.2 times greater than the area of the first sub-pixel electrode 191a.

The second sub-pixel electrode 191b includes a pair of branches 195 extending along the data line 171. The pair of branches 195 are disposed between the first sub-pixel electrode 191a and the data lines 171a and 171b, and they are connected to each other at a lower end of the first sub-pixel electrode 191a. The first and second sub-pixel electrodes 191a and 191b are physically and electrically connected to the first and second drain electrodes 175a and 175b through contact holes 185a and 185b such that a data voltage is applied thereto from the first and second drain electrodes 175a and 175b.

When voltages are applied to the pixel electrode 191 and the common electrode 270, the long axes of the liquid crystals 310 change directions to become perpendicular to the direction of the electric field in response to the electric field formed between the pixel electrode 191 and the common electrode 270. A changed degree of polarization of light passing through the liquid crystal layer 3 varies according to the tilted degree of the liquid crystals 310. The change in the polarization is represented by a change in transmittance of light by a polarizer, and as a result, each pixel displays a predetermined desired luminance.

The tilt direction of the liquid crystals 310 is determined by the minute branches 194a, 194b, 194c, 194d of the pixel electrode 191, and the liquid crystals 310 are tilted in a direction that is parallel to a length direction of the minute branches 194a, 194b, 194c, and 194d. Since one pixel electrode 191 includes four sub-regions Da, Db, Dc, and Dd in which length directions of the minute branches 194a, 194b, 194c, and 194d are different from each other, the tilt directions of the liquid crystals 310 include four directions and four domains, in which the alignment directions of the liquid crystals 310 that are different from each other are formed in the liquid crystal layer 3. Thus, a viewing angle of the liquid crystal display can be enhanced by varying the tilt directions of the liquid crystal molecules.

The description of the thin film transistors and the pixel electrode 191 described above is one illustrative example, and the structure of the thin film transistors and the design of the pixel electrode may be modified to enhance side visibility rather than being restrictive to the above-described structure. For example, an RD-TFT structure capable of improving visibility may be formed by using a voltage differential effect generated for each region according to the distribution of resistance.

Hereinafter, an exemplary embodiment of a method for manufacturing the liquid crystal display will be described with reference to FIGS. 5 to 9. The exemplary embodiment of the manufacturing method described below is not limited thereto, and it may be modified.

FIGS. 5 to 9 illustrate cross-sectional views of an exemplary embodiment of a method for manufacturing the liquid crystal display.

Figure 5:
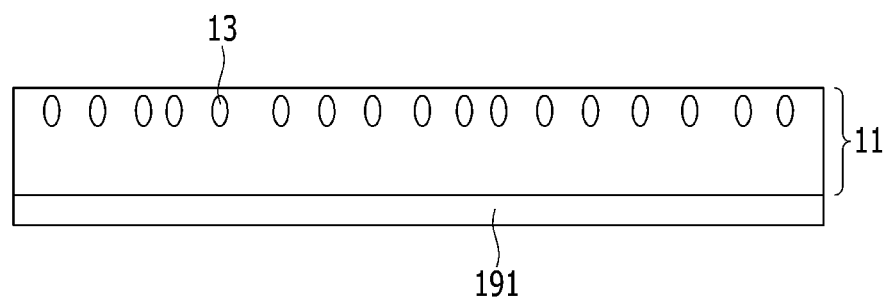
FIG. 5 to FIG. 9 schematically illustrate cross-sectional views of an exemplary embodiment of a manufacturing method of the liquid crystal display.

Referring to FIG. 1, FIG. 2, and FIG. 5, constituent elements included in the lower panel 100 and the upper panel 200 may be respectively manufactured. The alignment layer 11 may be formed above the pixel electrode 191 in the lower panel 100, and the alignment layer 21 may be formed above the common electrode 270 in the upper panel 200. Hereinafter, a method for forming the alignment layers 11 and 21 will be described.

An alignment solution for forming the main chain and the side chain of the alignment layer 11 and the alignment material including the reactive mesogen 13 included in the alignment solution are coated on the pixel electrode 191 such that alignment layer 11 is formed. Here, the reactive mesogen 13 may be added to the solid content of the alignment solution in a range of from about 7 wt % to about 25 wt %.

Figure 6:
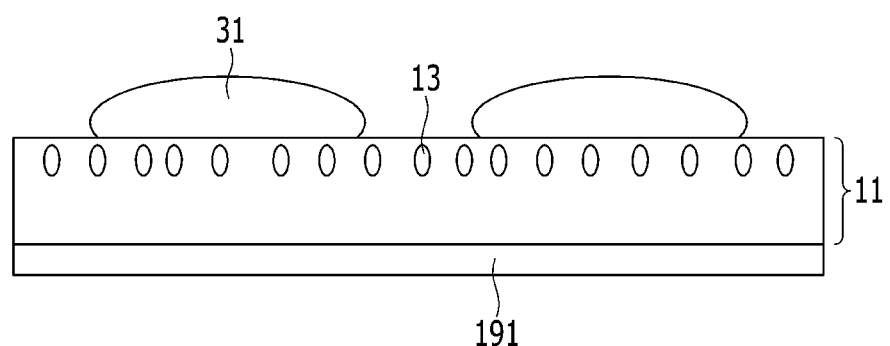

Referring to FIG. 6, a liquid crystal material 31 including liquid crystal molecules is disposed on the alignment layer 11.

Figure 7:
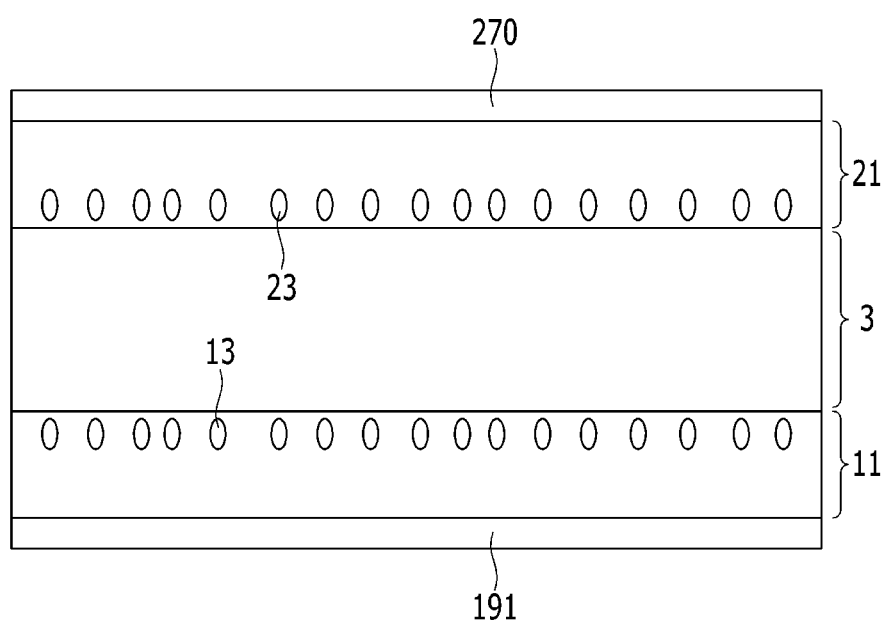

Next, referring to FIG. 7, the common electrode 270 is formed on the second substrate 210 in the upper panel 200. Next, the alignment solution for forming the main chain and the side chain along with the alignment material including the reactive mesogen 23 included in the alignment solution are coated on the common electrode 270. Here, the reactive mesogen 13 may be added to the solid content of the alignment solution in a range of from about 7 wt % to about 25 wt %.

Next, the lower panel 100 and the upper panel 200 manufactured by the above-stated method are assembled.

Figure 8:
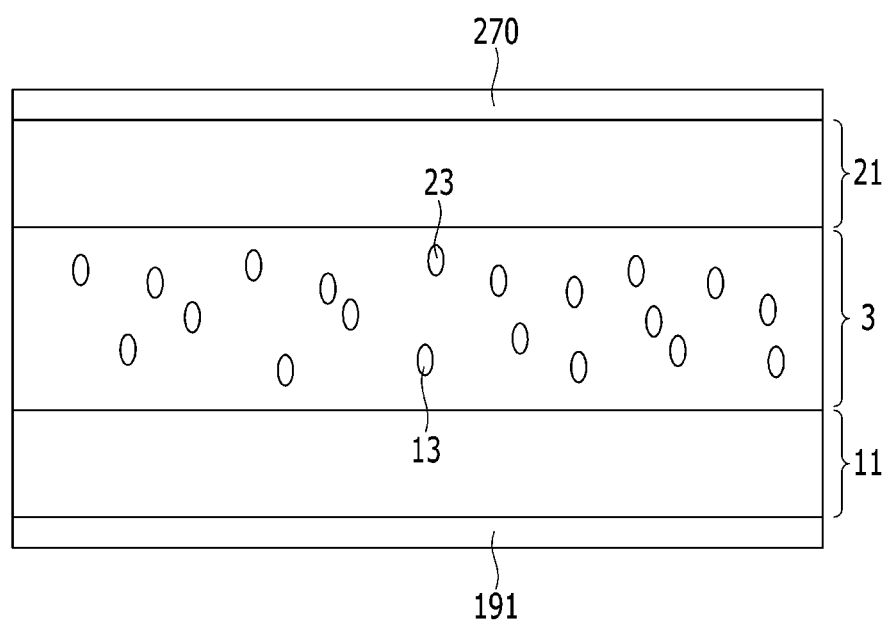

Referring to FIG. 8, the alignment layers 11 and 21 are baked or thermally treated to discharge the reactive mesogens 13 and 23 included in the alignment layers 11 and 21 to the liquid crystal layer 3. In an exemplary embodiment, the reactive mesogens 13 and 23 included in the alignment layers 11 and 21 include at least one of the compounds respectively represented by Chemical Formula RM-1 to Chemical Formula RM-24, and the reactive mesogens have high light reactivity when exposed to ultraviolet ("UV") irradiation. However, prior to UV irradiation, the reactive mesogen is polymerized in advance in the bake process or thermal treatment process so that the degree of forming pre-tilt angles by polymerization from the UV irradiation, which is a subsequent process, may be weakened. However, since the side chains of the alignment layers 11 and 21 include the polymerization inhibiting group, earlier polymerization of the reactive mesogen can be prevented.

Next, light is irradiated while a voltage is applied to the pixel electrode 191 and the common electrode 270. Any light having a wavelength that can polymerize the reactive mesogens 13 and 23 may be used, and for example, ultraviolet rays and/or the like may be used.

Figure 9:
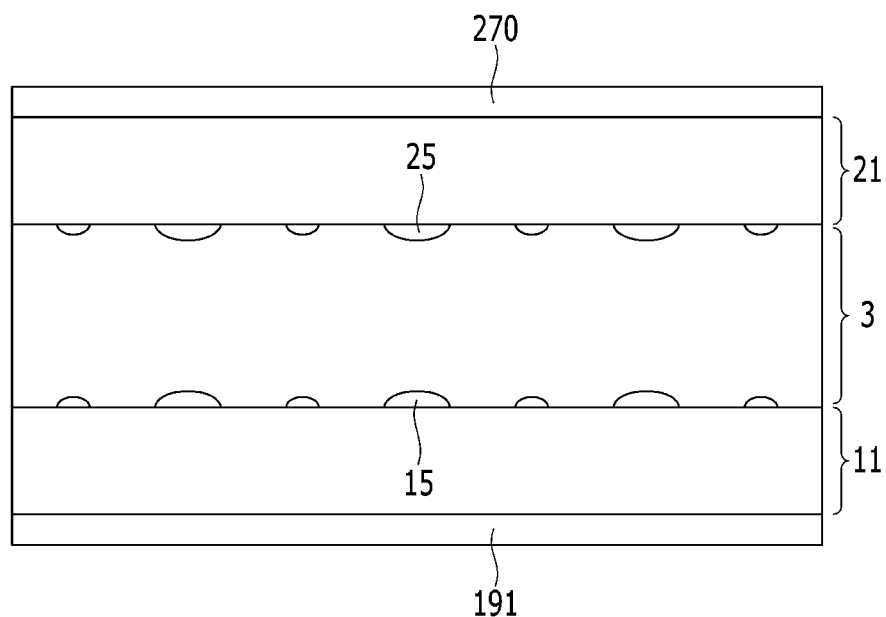

Referring to FIG. 9, as the surface energy is increased while the reactive mesogens 13 and 23 included in the liquid crystal layer 3 are polymerized, the reactive mesogens 13 and 23 move to the surfaces of the alignment layers 11 and 21 such that alignment polymers are formed. The alignment polymers have pre-tilt angles, and the bumps 15 and 25 are formed by collecting the alignment polymers.

Figure 10:
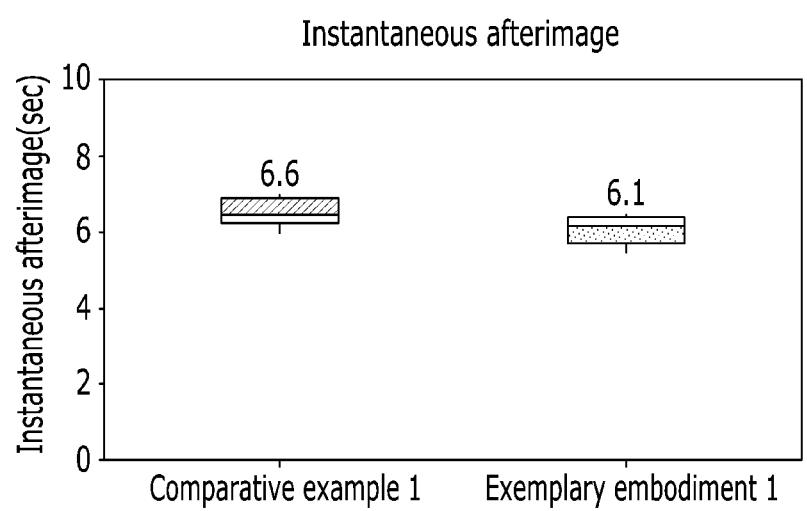
FIG. 10 and FIG. 11 are graphs showing comparisons of instantaneous images and black afterimages between an exemplary embodiment of the liquid crystal display and a conventional liquid crystal display.
Figure 11:
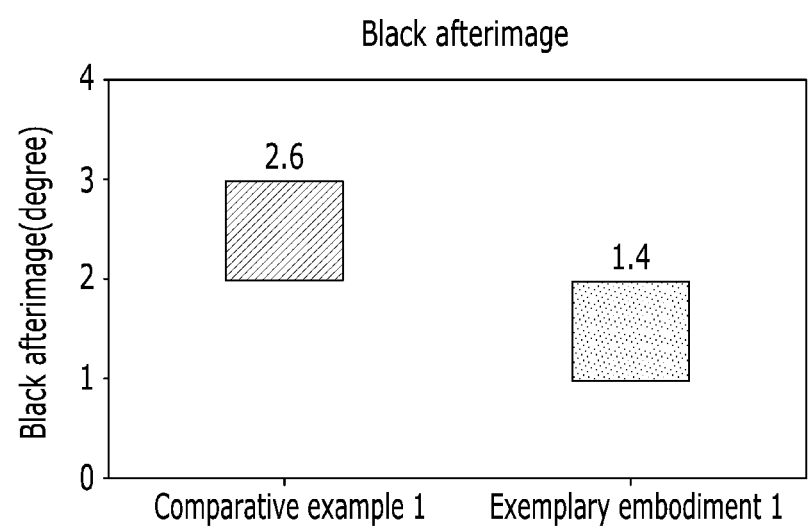

FIG. 10 and FIG. 11 are graphs showing comparisons between instantaneous images and black afterimages of an exemplary embodiment of the liquid crystal display and an example of a comparative liquid crystal display.

In FIG. 10 and FIG. 11, in Comparative Example 1, an alignment layer is formed which includes a photoinitiator in a side chain such as a copolymer including a compound represented by Chemical Formula 4, and a reactive mesogen represented by Chemical Formula 5 is used. In Exemplary Example 1, an exemplary embodiment of an alignment layer is formed which includes a polymer inhibiting agent group in a side chain such as a first polymer including the compound represented by Chemical Formula 2, and a reactive mesogen represented by Chemical Formula 6 is used. The reactive mesogen of Comparative Example 1 has a lower reactivity with respect to heat and light compared to the reactive mesogen of Exemplary Example 1. Chemical Formulas 4-6 are shown below:

Chemical Formula 4

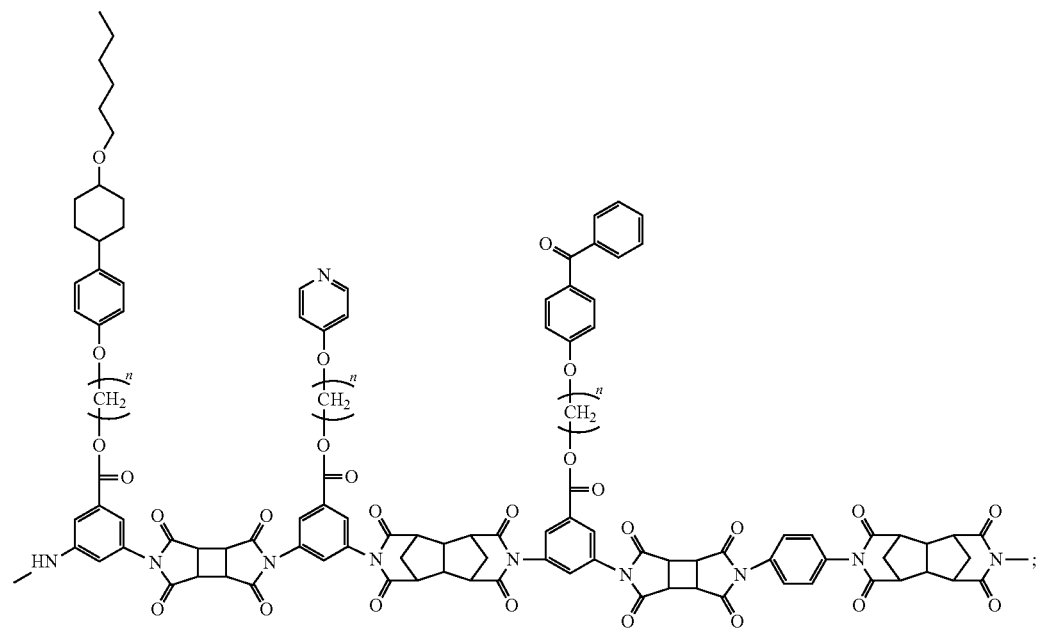

-continued

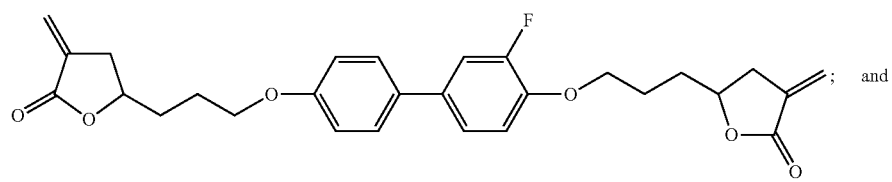

Chemical Formula 5

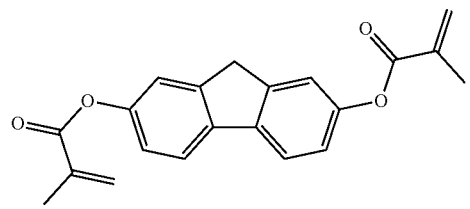

Chemical Formula 6

Referring to FIG. 10 and FIG. 11, in Exemplary Example 1, an exemplary embodiment of an alignment layer that includes a polymer inhibiting agent group in the side chain is formed and the liquid crystal display is formed using a reactive mesogen having high reactivity as in Chemical Formula 6. The resulting instantaneous afterimage and a black afterimage of the Exemplary Example 1 are improved compared to Comparative Example 1.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A liquid crystal display comprising:
    a first substrate;
    a second substrate facing the first substrate;
    a liquid crystal layer disposed between the first substrate and the second substrate and including a reactive mesogen;
    an alignment layer disposed between the first substrate and the liquid crystal layer and/or between the liquid crystal layer and the second substrate; and
    bumps disposed adjacent to a surface of the alignment layer,
    wherein the alignment layer comprises a main chain and a plurality of side chains connected to the main chain, and
    wherein the side chains comprise a polymerization inhibiting agent group.

2. The liquid crystal display of claim 1, wherein the bumps comprise alignment polymers having pre-tilt angles.

3. The liquid crystal display of claim 2, wherein the polymerization inhibiting agent group has a property of suppressing polymerization by heat.

4. The liquid crystal display of claim 3, wherein the polymerization inhibiting agent group comprises at least one group selected from a group consisting of:

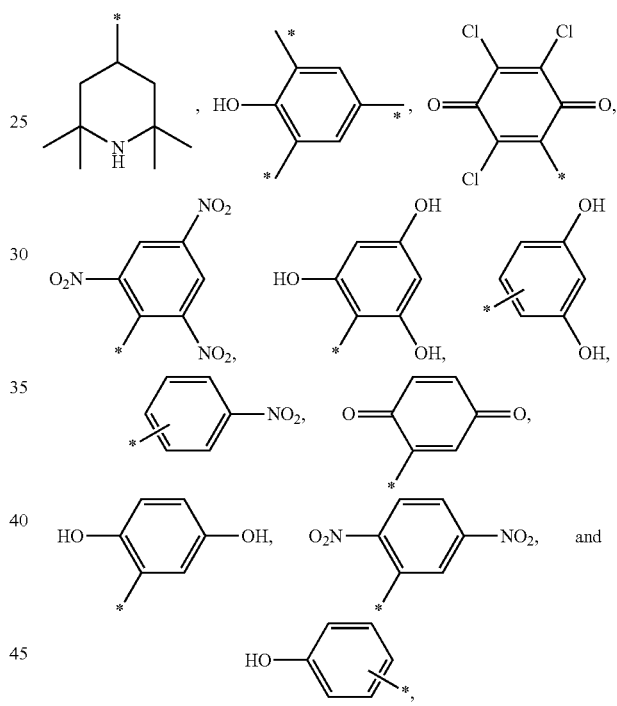

wherein * denotes a portion connected with another connection group or main chain.

5. The liquid crystal display of claim 4, wherein the side chains comprise

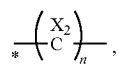

wherein X denotes H, $(CH_2)_m(CH_3)$, F, Br, I, OH, $NH_2$, or CN, m denotes a number from 0 to 20, and n denotes a number from 0 to 20.

6. The liquid crystal display of claim 5, wherein the side chains comprise

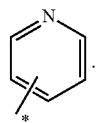

7. The liquid crystal display of claim 6, wherein the alignment layer comprises a first copolymer, the first copolymer comprising a unit body represented by Structural Formula A:

Structural Formula A

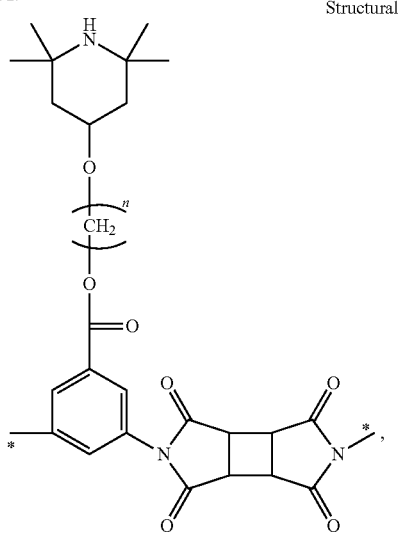

wherein n denotes a number from 0 to 20.

8. The liquid crystal display of claim 7, wherein the alignment layer further comprises a second copolymer including at least one unit body among unit bodies represented by Structural Formula B, Structural Formula C, and Structural Formula D:

Structural Formula B

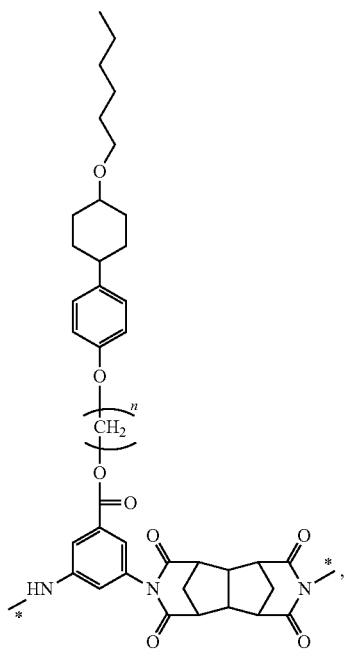

wherein n denotes a number from 0 to 20;

Structural Formula C

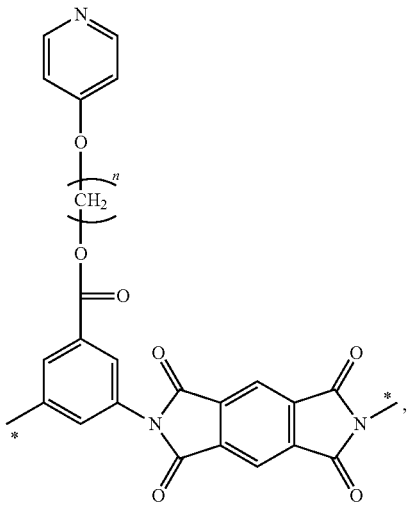

wherein n denotes a number from 0 to 20; and

Structural Formula D

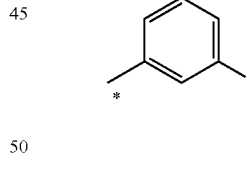

9. The liquid crystal display of claim 8, wherein a mole ratio between the first copolymer and the second copolymer is about 5:5.

10. The liquid crystal display of claim 2, wherein the reactive mesogen comprises at least one compound selected from the group of compounds represented by Chemical Formulas RM-1 to Chemical Formula RM-23:

Chemical Formula RM-1
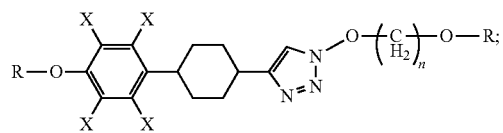
Chemical Formula RM-2
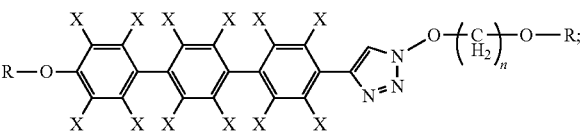
Chemical Formula RM-3
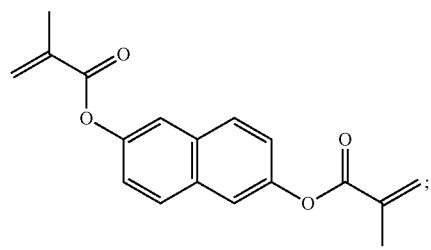
Chemical Formula RM-4
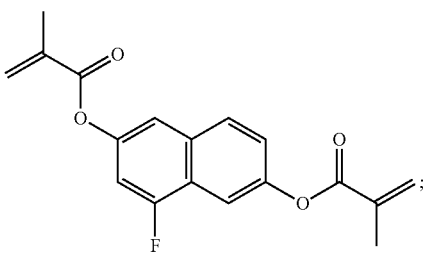
Chemical Formula RM-5
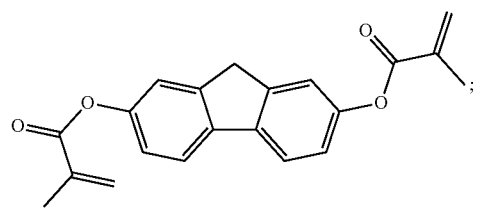
Chemical Formula RM-6
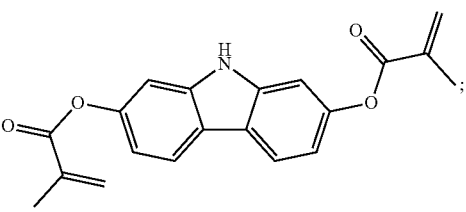
Chemical Formula RM-7
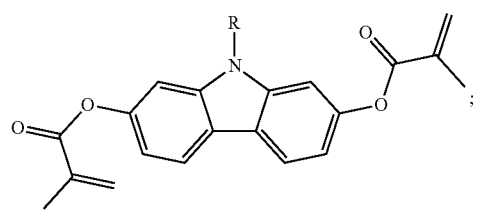
Chemical Formula RM-8
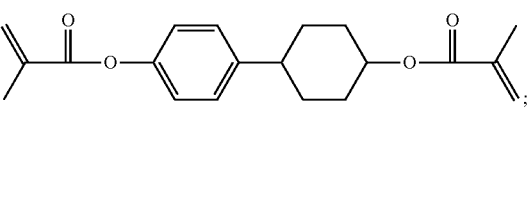
Chemical Formula RM-9
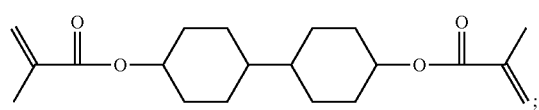
Chemical Formula RM-10
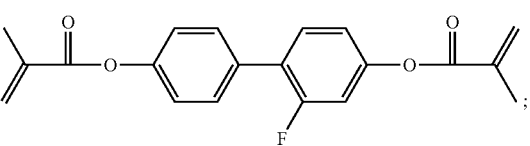
Chemical Formula RM-11
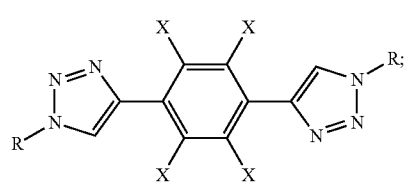
Chemical Formula RM-12
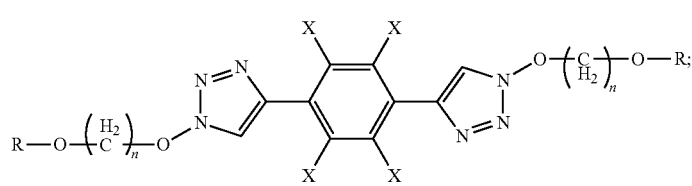
Chemical Formula RM-13
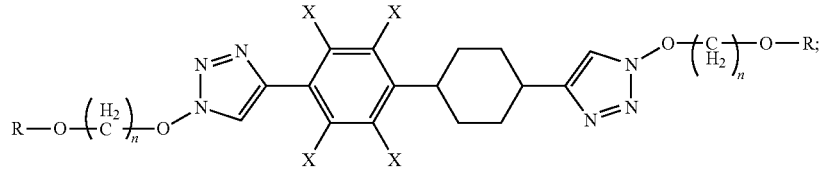
Chemical Formula RM-14

-continued

Chemical Formula RM-15
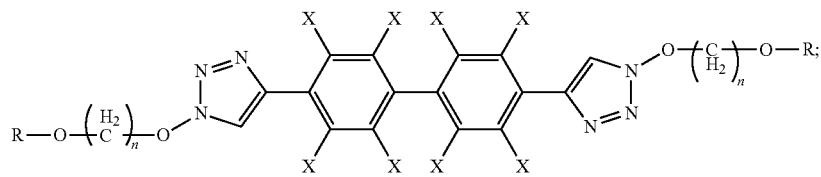

Chemical Formula RM-16
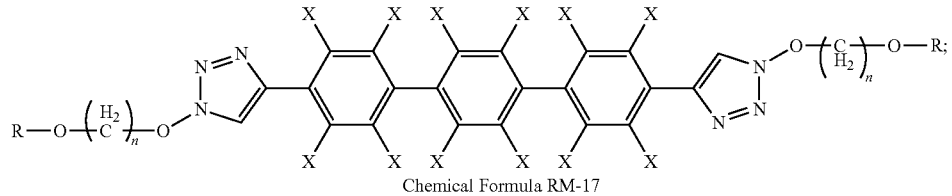

Chemical Formula RM-17
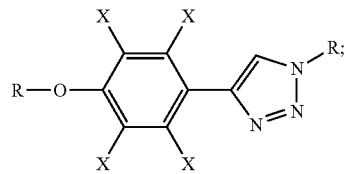

Chemical Formula RM-18
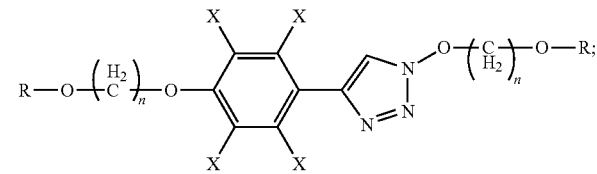

Chemical Formula RM-19
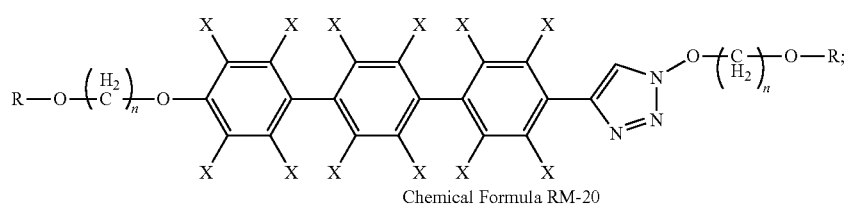

Chemical Formula RM-20
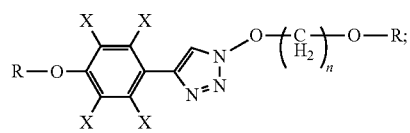

Chemical Formula RM-21
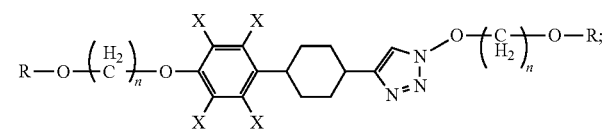

Chemical Formula RM-22
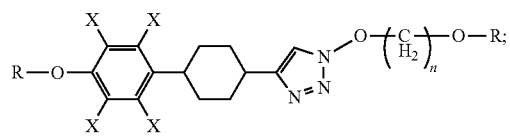

Chemical Formula RM-23
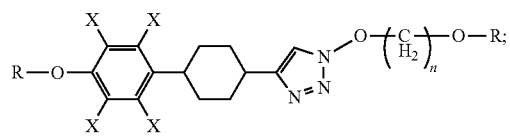

wherein, in each of Chemical Formula RM-1, Chemical Formula RM-2, Chemical Formula RM-7, Chemical Formula RM-11, and Chemical Formula RM-12 to Chemical Formula RM-23, X is one of —H, —$CH_3$, —$(CH_2)_m(CH_3)$, —F, —Br, —I, —OH, —$NH_2$, and —CN, R is one of

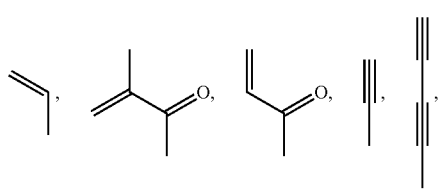

m in —$(CH_2)(CH_3)$ and in

is a number from 0 to 20, and n in the above chemical formulas is a number from 0 to 20.

11. The liquid crystal display of claim 1, wherein the polymerization inhibiting agent group is located at an end of a side chain located away from the main chain.

12. The liquid crystal display of claim 1, wherein liquid crystal molecules included in the liquid crystal layer are substantially vertically aligned when an electric field is not applied.

13. A method for manufacturing a liquid crystal display, comprising:

forming a field generating electrode on at least one of a first substrate and a second substrate that faces the first substrate;

coating an alignment material and an alignment assistant agent on the field generating electrode;

forming a liquid crystal layer including liquid crystal molecules between the first substrate and the second substrate;

forming an alignment layer including a main chain and a side chain connected to the main chain by baking the alignment material;

discharging the alignment assistant agent to the liquid crystal layer; and irradiating light when an electric field is applied thereto, wherein the side chain comprises a polymerization inhibiting agent group, and the alignment assistant agent discharged to the liquid crystal layer is polymerized when the light is irradiated such that bumps are formed adjacent to a surface of the alignment layer.

14. The method of manufacturing the liquid crystal display of claim 13, wherein the bumps comprise alignment polymers formed by polymerization of the alignment assistant agent and the bumps have pre-tilt angles.

15. The method of manufacturing the liquid crystal display of claim 14, wherein the polymerization inhibiting agent group suppresses polymerization of the alignment assistant agent during baking of the alignment material.

16. The method of manufacturing the liquid crystal display of claim 15, wherein:

the polymerization inhibiting agent group comprises at least one group selected from a group consisting of

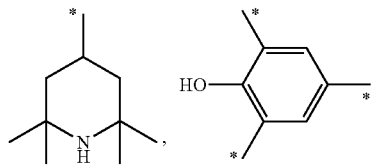

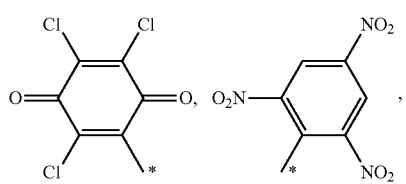

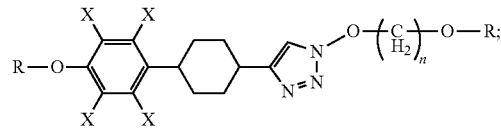

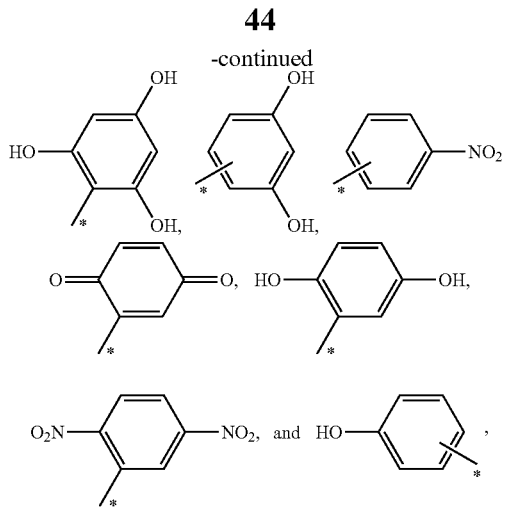

wherein * denotes a portion connected with another connection group or main chain.

17. The method of manufacturing the liquid crystal display of claim 16, wherein the alignment layer comprises a first copolymer, and the first copolymer comprises a unit body represented by Structural Formula A:

Structural Formula A

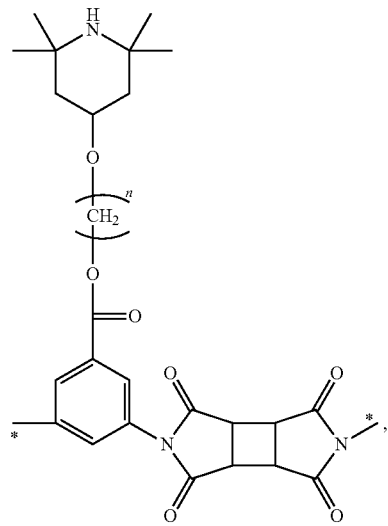

wherein n denotes a number from 0 to 20.

18. The method of manufacturing the liquid crystal display of claim 13, wherein the reactive mesogen comprises at least one compound selected from the group of compounds represented by Chemical Formula RM-1 to Chemical Formula RM-23:

Chemical Formula RM-1

Chemical Formula RM-2

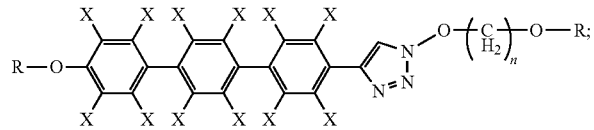

-continued
Chemical Formula RM-3
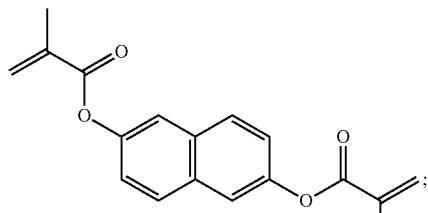
Chemical Formula RM-4
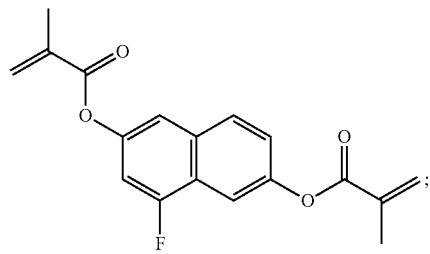
Chemical Formula RM-5
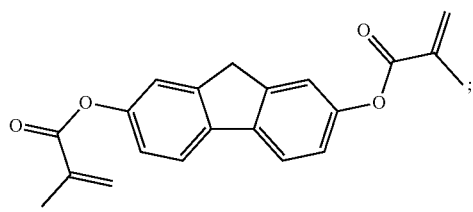
Chemical Formula RM-6
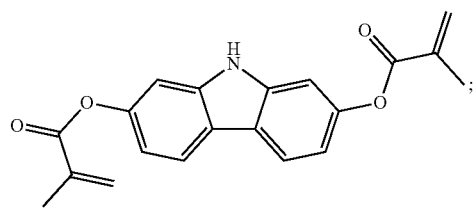
Chemical Formula RM-7
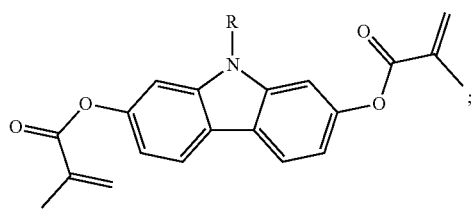
Chemical Formula RM-8
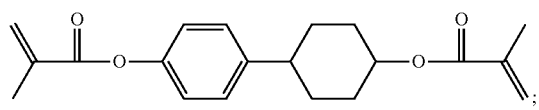
Chemical Formula RM-9
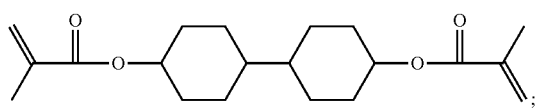
Chemical Formula RM-10
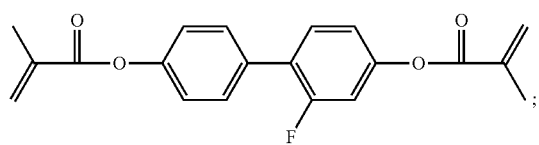
Chemical Formula RM-11
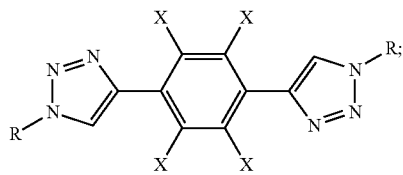
Chemical Formula RM-12
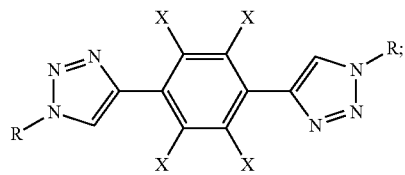
Chemical Formula RM-13
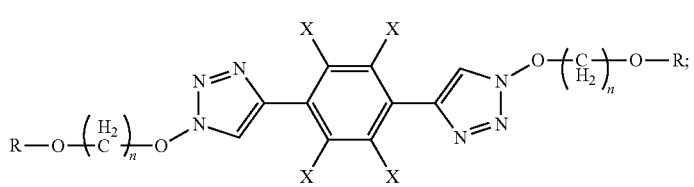
Chemical Formula RM-14
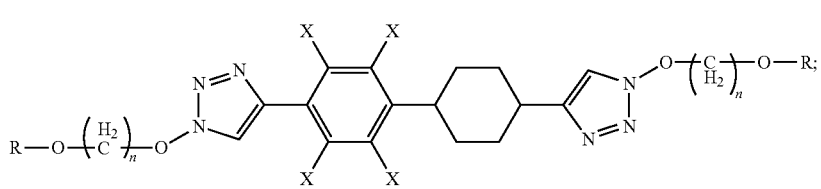

-continued

Chemical Formula RM-15
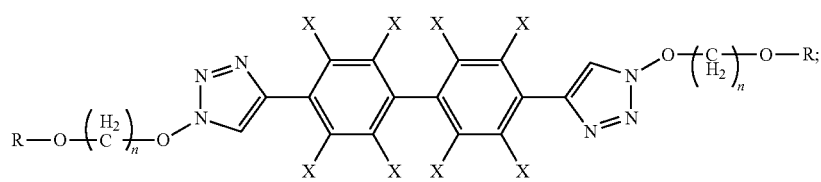

Chemical Formula RM-16
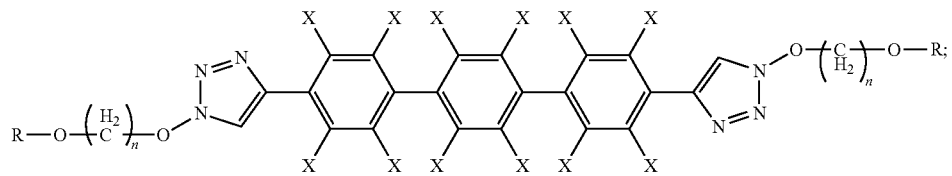

Chemical Formula RM-17
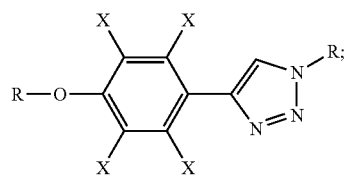

Chemical Formula RM-18
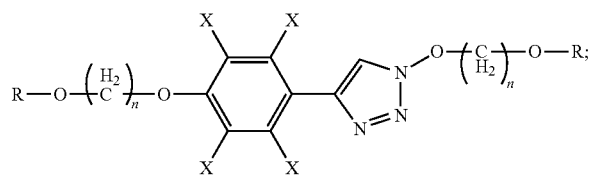

Chemical Formula RM-19
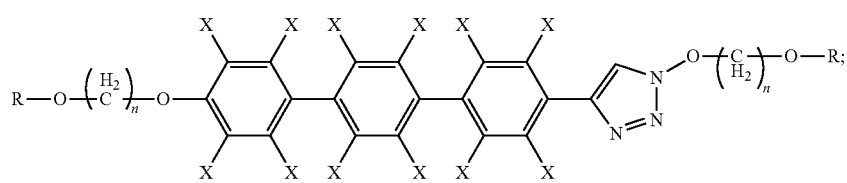

Chemical Formula RM-20
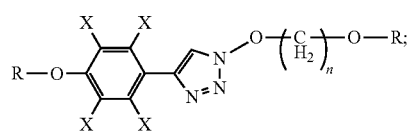

Chemical Formula RM-21
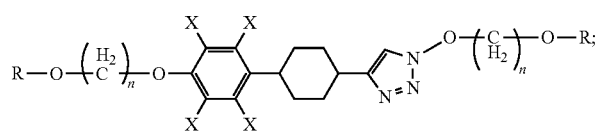

Chemical Formula RM-22
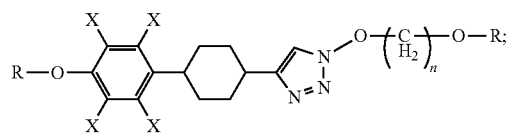

Chemical Formula RM-23 wherein, in each of Chemical Formula RM-1, Chemical Formula RM-2, Chemical Formula RM-7, Chemical Formula RM-11, and Chemical Formula RM-12 to Chemical Formula RM-23, X is one of —H, —CN$_3$, —(CH$_2$)$_m$(CH$_3$), —F, —Br, —I, OH, —NH$_2$, and —CN, R is one of

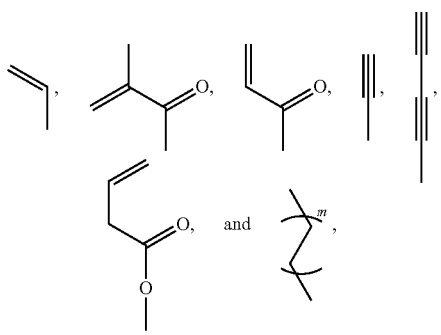

wherein m in —(CH$_2$)$_m$(CH$_3$) and in

is a number from 0 to 20, and n in the above chemical formulas is a number from 0 to 20.

19. The method of manufacturing the liquid crystal display of claim 13, wherein the polymerization inhibiting agent group is located at an end of the side chain located away from the main chain.

20. The method for manufacturing the liquid crystal display of claim 13, wherein liquid crystal molecules included in the liquid crystal layer are vertically aligned when an electric field is not applied.

* * * * *